US010979291B2

United States Patent
Izard et al.

(10) Patent No.: US 10,979,291 B2
(45) Date of Patent: *Apr. 13, 2021

(54) SYSTEMS AND METHODS TO BUILD A MONITORING FABRIC

(71) Applicant: Big Switch Networks LLC, Santa Clara, CA (US)

(72) Inventors: Ryan Izard, Manteca, CA (US); Christian Geddings Barrineau, Seneca, SC (US); Sandip Shah, Milpitas, CA (US); Shudong Zhou, Fremont, CA (US); Andrew Shaw, Palo Alto, CA (US)

(73) Assignee: Big Switch Networks LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/121,247

(22) Filed: Sep. 4, 2018

(65) Prior Publication Data

US 2018/0375727 A1    Dec. 27, 2018

Related U.S. Application Data

(63) Continuation of application No. 15/081,166, filed on Mar. 25, 2016, now Pat. No. 10,097,413.

(Continued)

(51) Int. Cl.
*H04L 12/24* (2006.01)
*H04L 12/707* (2013.01)
*H04L 29/12* (2006.01)

(52) U.S. Cl.
CPC .......... *H04L 41/0816* (2013.01); *H04L 41/14* (2013.01); *H04L 41/0604* (2013.01);

(Continued)

(58) Field of Classification Search
None
See application file for complete search history.

(56) References Cited

U.S. PATENT DOCUMENTS 7,310,306 B1 * 12/2007 Cheriton ................. H04L 45/00
370/218
7,327,688 B2 * 2/2008 Burwell .............. H04L 12/4608
370/242

(Continued)

FOREIGN PATENT DOCUMENTS

CN       107710684 A      2/2018
EP         3275126 B1     11/2019

(Continued)

OTHER PUBLICATIONS

"U.S. Appl. No. 15/081,166, Notice of Allowance dated Jan. 10, 2018", 19 pgs.

(Continued)

*Primary Examiner* — Jamaal Henson
(74) *Attorney, Agent, or Firm* — Schwegman Lundberg & Woessner, P.A.

(57) ABSTRACT

Systems and methods for building a monitoring fabric are described. The system receives a duplicate of a first portion of traffic information from a first network as first traffic information and communicates the first traffic information in the monitoring fabric. The first traffic information is communicated to a controller that configures the monitoring fabric. The system receives a duplicate of a second portion of the traffic information from the first network as second traffic information. The system forwards the second traffic information to at least one tool.

20 Claims, 24 Drawing Sheets

Related U.S. Application Data

(60) Provisional application No. 62/139,326, filed on Mar. 27, 2015.

(52) U.S. Cl.
CPC .......... *H04L 41/0668* (2013.01); *H04L 45/22* (2013.01); *H04L 61/103* (2013.01); *H04L 61/2015* (2013.01)

(56) References Cited

U.S. PATENT DOCUMENTS

| | | | | |
|---|---|---|---|---|
| 7,418,492 | B1 * | 8/2008 | Cohen | H04L 43/00 709/224 |
| 7,729,240 | B1 | 6/2010 | Crane et al. | |
| 7,889,748 | B1 | 2/2011 | Leong et al. | |
| 7,995,580 | B2 * | 8/2011 | Patel | H04L 47/6225 370/229 |
| 8,615,008 | B2 | 12/2013 | Natarajan et al. | |
| 8,687,629 | B1 | 4/2014 | Kompella et al. | |
| 8,862,706 | B2 * | 10/2014 | Wittenschlaeger | G06F 9/54 709/221 |
| 10,097,413 | B2 | 10/2018 | Zhou et al. | |
| 10,142,263 | B2 | 11/2018 | Raney | |
| 10,205,648 | B1 * | 2/2019 | Guo | H04L 43/12 |
| 10,419,327 | B2 | 9/2019 | Izard et al. | |
| 10,841,242 | B2 | 11/2020 | Zhou et al. | |
| 2005/0108444 | A1 * | 5/2005 | Flauaus | H04L 47/11 710/15 |
| 2005/0254490 | A1 * | 11/2005 | Gallatin | H04L 41/046 370/389 |
| 2008/0025322 | A1 * | 1/2008 | Tadimeti | H04L 41/08 370/400 |
| 2009/0245258 | A1 * | 10/2009 | Tanaka | H04L 49/351 370/392 |
| 2009/0290501 | A1 * | 11/2009 | Levy | H04L 49/70 370/250 |
| 2012/0131674 | A1 * | 5/2012 | Wittenschlaeger | G06F 21/552 726/23 |
| 2012/0320917 | A1 | 12/2012 | Song | |
| 2013/0094515 | A1 | 4/2013 | Gura et al. | |
| 2013/0159864 | A1 | 6/2013 | Smith et al. | |
| 2013/0259037 | A1 * | 10/2013 | Natarajan | H04L 12/465 370/390 |
| 2014/0029622 | A1 | 1/2014 | Bettink et al. | |
| 2014/0355613 | A1 * | 12/2014 | Pope | H04L 49/20 370/392 |
| 2015/0067125 | A1 | 3/2015 | Madani et al. | |
| 2015/0156098 | A1 * | 6/2015 | Richards | H04L 43/0894 709/224 |
| 2015/0172143 | A1 * | 6/2015 | Degioanni | H04L 43/04 370/252 |
| 2016/0285685 | A1 | 9/2016 | Zhou et al. | |
| 2017/0324632 | A1 | 11/2017 | Arora | |
| 2020/0274825 | A1 | 8/2020 | Zhou et al. | |

FOREIGN PATENT DOCUMENTS

| | | |
|---|---|---|
| WO | WO-2016160553 A1 | 10/2016 |
| WO | WO-2020172445 A1 | 8/2020 |

OTHER PUBLICATIONS

"U.S. Appl. No. 15/081,166, Notice of Allowance dated Jun. 4, 2018", 19 pgs.
"European Application Serial No. 16773827.7, Extended European Search Report dated Feb. 28, 2018", 11 pgs.
"International Application Serial No. PCT/US2016/024178, International Preliminary Report on Patentability dated Oct. 12, 2017", 13 pgs.
"International Application Serial No. PCT/US2016/024178, International Search Report dated Jun. 17, 2016", 3 pgs.
"International Application Serial No. PCT/US2016/024178, Written Opinion dated Jun. 17, 2016", 12 pgs.
Chao, H J, "PetaStar: A Petabit Photonic Packet Switch", IEEE Journal of Selected Areas in Communications. vol. 21. No. 7., (Sep. 2003), 1096-1112.
U.S. Appl. No. 15/081,166 U.S. Pat. No. 10,097,413, Mar. 25, 2016, Building a Hyper-Scale Monitoring Fabric.
U.S. Appl. No. 16/282,090, filed Feb. 21, 2019, Systems and Methods to Scale a Network Monitoring Fabric.
"Chinese Application Serial No. 201680029959.5, Decision of Rejection dated Mar. 4, 2020", w/ English Translation, 12 pgs.
"Chinese Application Serial No. 201680029959.5, Office Action dated Oct. 11, 2019", W/ English Translation, 13 pgs.
"Chinese Application Serial No. 201680029959.5, Response filed Dec. 26, 2019 to Office Action dated Oct. 11, 2019", w/o English Claims, 8 pgs.
"Chinese Application Serial No. 201680029959.5, Office Action dated Mar. 5, 2019", w/ English Translation, 20 pgs.
"Chinese Application Serial No. 201680029959.5, Response Filed Jul. 22, 2019 to Office Action dated Mar. 5, 2019", w/ English Claims, 22 pgs.
"European Application Serial No. 16773827.7, Communication Pursuant to Article 94(3) EPC dated Dec. 12, 2018", 7 pgs.
"European Application Serial No. 16773827.7, Response Filed Apr. 18, 2019 Communication Pursuant to Article 94(3) EPC dated Dec. 12, 2018", 15 pgs.
"U.S. Appl. No. 16/282,090, Notice of Allowance dated May 15, 2020", 9 pgs.
"U.S. Appl. No. 16/282,090, Corrected Notice of Allowability dated Jun. 29, 2020", 2 pgs.
"Chinese Application Serial No. 201680029959.5, Decision of Reexamination dated Jul. 15, 2020", 1 pg.
"Chinese Application Serial No. 201680029959.5, Response filed Jun. 19, 2020 to Decision of Rejection dated Mar. 4, 2020", w/o English Claims, 14 pgs.
"International Application Serial No. PCT/US2020/019088, International Search Report dated May 29, 2020", 5 pgs.
"International Application Serial No. PCT/US2020/019088, Written Opinion dated May 29, 2020", 8 pgs.
"U.S. Appl. No. 16/282,090, Corrected Notice of Allowability dated Sep. 23, 2020", 2 pgs.
"U.S. Appl. No. 16/282,090, Notice of Allowance dated Sep. 14, 2020", 8 pgs.
"U.S. Appl. No. 16/282,090, Notice of Allowance dated Sep. 23, 2020", 5 pgs.
"Chinese Application Serial No. 201680029959.5, Office Action dated Sep. 30, 2020", w/ English Translation, 7 pgs.

* cited by examiner

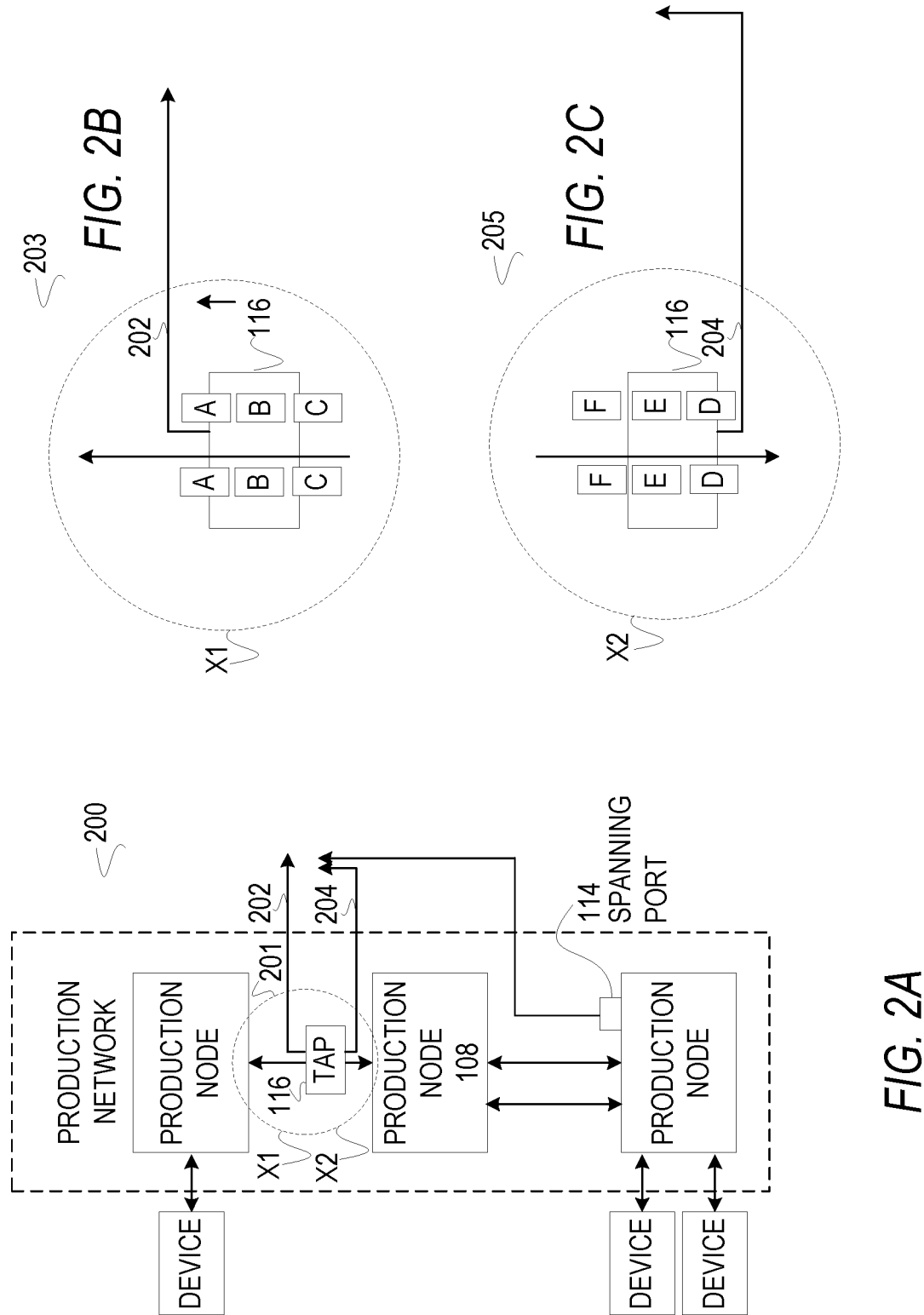

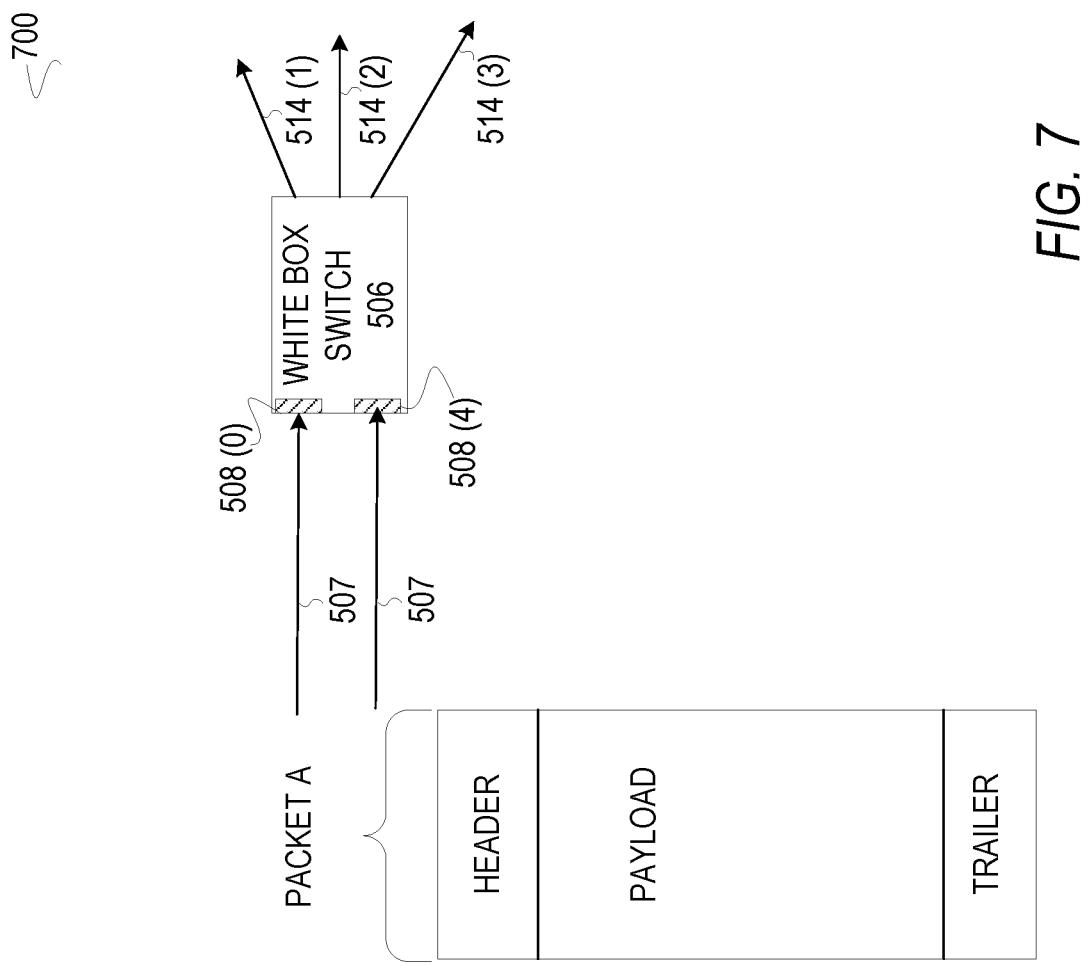
FIG. 7

| SWITCH ALIAS | SWITCH | INTERFACE | TAP INTERFACE | OBSERVED IPS | | |
|---|---|---|---|---|---|---|
| BT-SWITCH1 | 00:00:5C:16:C7:17:C1:3B | ETHERNET3 | DT-LEAF1A | VLAN 0 | VLAN 2 | VLAN 3 |
| | | | | 10.1.0.0/20 | 10.1.10.0/27 | 10.1.10.128/27 |
| | | | | VLAN 4 | VLAN 5 | VLAN 5 |
| | | | | 10.1.11.1/32 | 10.1.11.128/27 | 10.1.0.72/29 |
| | | | | VLAN 7 | | |
| | | | | 10.1.0.81/32 | | |
| BT-SWITCH1 | 00:00:5C:16:C7:17:C1:3B | ETHERNET4 | DT-LEAF1B | VLAN 0 | VLAN 2 | VLAN 3 |
| | | | | 10.1.0.0/20 | 10.1.10.0/27 | 10.1.10.129/32 |
| | | | | VLAN 4 | VLAN 5 | VLAN 6 |
| | | | | 10.1.11.1/32 | 10.1.11.128/27 | 10.1.0.76/32 |

*FIG. 12*

DHCP TRACKER

FILTER TABLE ROWS   [FILTER] ✕ ⧉

| SERVER ADDRESS | CLIENT COUNT | LEASE TIME | RELAY | SUBNETS |
|---|---|---|---|---|
| 10.1.5.200 | 284 | 0 secs | | 10.2.2.0/23, 10.1.6.0/24, 10.1.7.0/24, 10.1.8.0/23, 10.1.10.0/25, and 3 More... |
| 10.3.0.4 | 153 | 8 hours | ✓ | 10.8.0.0/18, 10.8.67.0/24, 10.9.16.0/23, 10.9.18.0/23 |
| 10.3.0.5 | 1 | 1 hour | | 10.2.0.0/22 |
| 10.3.0.6 | 41 | 10 mins | | 10.4.4.0/24, 10.4.100.0/24, 10.5.0.0/24, 10.5.6.0/24 |
| 10.3.0.7 | 19 | 1 hour, 50 mins | | 10.6.0.0/15 |
| 10.3.0.9 | 23 | 10 mins | | 10.2.16 |
| 192.168.100.1 | 9 | 5 mins | | 192.168.100.0/24 |

TOPOLOGY

SELECT POLICY ▽ | FILTER | ✕

SWITCH
- ALIAS BT-SWITCH1
- DPID 00:00:5C:16:C17:17:C1:3B
- CONNECTED SINCE TODAY, 3:06:32PM PDT
- CONNECTED TIME 2.9 HOUR
- IP ADDRESS 10.2.8.123:58090
- # INTERFACES 54

INTERFACE
- NAME ETHERNET34
- HARDWARE ADDRESS 5C:16:C7:17:C1:5D
- NUMBER 34

TAP CONFIGURATION
- STATE UP  NAME T5-LAB-MGMT
- SPEED GBIT/S  ROLE FILTER
- DIRECTION RX  VLAN 1034

CONNECTED DEVICE
- DEVICE NAME T5-ALPHA-LAB
- DEVICE DESCRIPTION GIGABIT ETHERNET SWITCH
- CHASSIS ID FC:75:16:96:5F:00
- PORT ID FC:75:16:96:60:16
- PORT DESCRIPTION D-LONK DGS-3420-28TC R1.00.024 PORT 23 ON UNIT 1
- MANAGEMENT ADDRESS —
- PROTOCOL LLDP

*FIG. 14*

| # | TCP CLIENT | CLIENT HOST TCP SERVER | SERVER HOST | APPLICATION | CONNECTION START |
|---|---|---|---|---|---|
| 1 | 10.0.16.51:53423 | 10.9.19.214:8009 | | | NOW |
| 2 | 10.9.19.242:3712 | 10.8.23.70:443 | | HTTPS | 8 SEC |
| 3 | 115.231.222.45:35644 | 173.227.38.53:22 | | SSH | 2 SEC |
| 4 | 173.227.38.50:19321 | 72.1.46.86:443 | PANASONIC.PROV.PHONE.COM | HTTPS | 7 SEC |
| 5 | 173.227.38.50:19380 | 74.125.224.0:443 | WWW3.L.GOOGLE.COM | HTTPS | 1 SEC |

BT-CONTROLLER1(CONFIG)# SHOW BIGTAP TCP-CONNECTIONS

FIG. 15

HOST TRACKER

FILTER TABLE ROWS

[FILTER] ✕

| HOST NAME | FILTER INTERFACE | FILTER INTERFACE COUNT | IP ADDRESS | MAC ADDRESS | VENDOR | VLAN IDs | EXTRA INFO | FIRST SEEN | LAST SEEN |
|---|---|---|---|---|---|---|---|---|---|
| WIN-RR1E04LOAKF | LAB-LEAF2A | 1 | 10.8.4.70 | 00:50:56:A6:6F:63 | VMWARE, INC. | 0 | DHCP SERVER 10.3.0.4 EXPIRES 7 HRS | 21 HOURS | 33 SEC |
| WEB-64 | LAB-LEAF2A | 1 | 10.8.4.137 | 00:50:56:A2:36:C9 | VMWARE, INC. | 0 | - | 15 HOURS | 4 HOURS |
| WEB-1 | LAB-LEAF2A | 1 | 10.2.18.194 | 00:50:56:9A:B1:80 | VMWARE, INC. | 0 | DHCP SERVER 10.3.0.9 EXPIRES 7 MIN | 22 HOURS | 15 SEC |

| BT-CONTROLLER1(CONFIG)# SHOW BIGTAP DNS-QUERIES | | | | | |
|---|---|---|---|---|---|
| # | CLIENT IP | CLIENT NAME | TARGET IP | TARGET NAME | QUERY TIME |
| 1 | 10.1.10.18 | | 74.125.224.0 | WWW3.L.GOOGLE.COM | 18 SEC |
| 2 | 10.1.10.18 | | 74.125.224.1 | WWW3.L.GOOGLE.COM | 18 SEC |
| 3 | 10.1.10.18 | | 74.125.224.14 | WWW3.L.GOOGLE.COM | 18 SEC |
| 4 | 10.1.10.18 | | 74.125.224.2 | WWW3.L.GOOGLE.COM | 18 SEC |
| 5 | 10.1.10.18 | | 74.125.224.3 | WWW3.L.GOOGLE.COM | 18 SEC |
| 6 | 10.1.10.18 | | 74.125.224.4 | WWW3.L.GOOGLE.COM | 18 SEC |

| DNSTRACKER | | |
|---|---|---|
| FILTER TABLE ROWS | | [FILTER] ✕ ⊡ |
| SERVER ADDRESS | SERVER NAME | SUBNETS |
| 4.2.2.1 | A.RESOLVERS.LEVEL3.NET | 173.227.38.50/32 |
| 4.2.2.2 | B.RESOLVERS.LEVEL3.NET | 173.227.38.50/32 |
| 4.2.2.3 | C.RESOLVERS.LEVEL3.NET | 173.227.38.50/32 |
| 4.2.2.4 | D.RESOLVERS.LEVEL3.NET | 173.227.38.50/32 |

*FIG. 18*

SYSTEMS AND METHODS TO BUILD A MONITORING FABRIC

RELATED APPLICATION

This application is a continuation of U.S. application Ser. No. 15/081,166, filed Mar. 25, 2016, which claims the priority benefit of U.S. Provisional Application No. 62/139,326, filed on Mar. 27, 2015, which is hereby incorporated by reference in its entirety.

TECHNICAL FIELD

This disclosure relates to the technical field of data communications and more particularly to systems and methods to build a monitoring fabric.

BACKGROUND

A production network may interconnect multiple devices by utilizing multiple technologies. Sometimes it does not function as anticipated. In such cases, the traffic being communicated on the production network may be passively monitored with one or more electronic tools. The tools may be utilized to identify a problem, design a work-around to avoid the problem, and test a long-term solution that solves the problem. Nevertheless, the tools may be expensive and difficult to manage.

BRIEF DESCRIPTION OF THE DRAWINGS

FIG. 2A is a block diagram illustrating duplication of traffic information, according to example embodiments;

FIG. 2B is a block diagram illustrating duplication of traffic information, according to example embodiments;

FIG. 2C is a block diagram illustrating duplication of traffic information, according to example embodiments;

FIG. 7 is a block diagram illustrating a system, according to an embodiment, to build a hyper-scale monitoring fabric;

FIG. 12 is a schematic diagram illustrating a user interface, according to an example embodiment;

FIGS. 13-18 are schematic diagrams illustrating user interfaces, according to various example embodiments;

DETAILED DESCRIPTION

Figure 1:
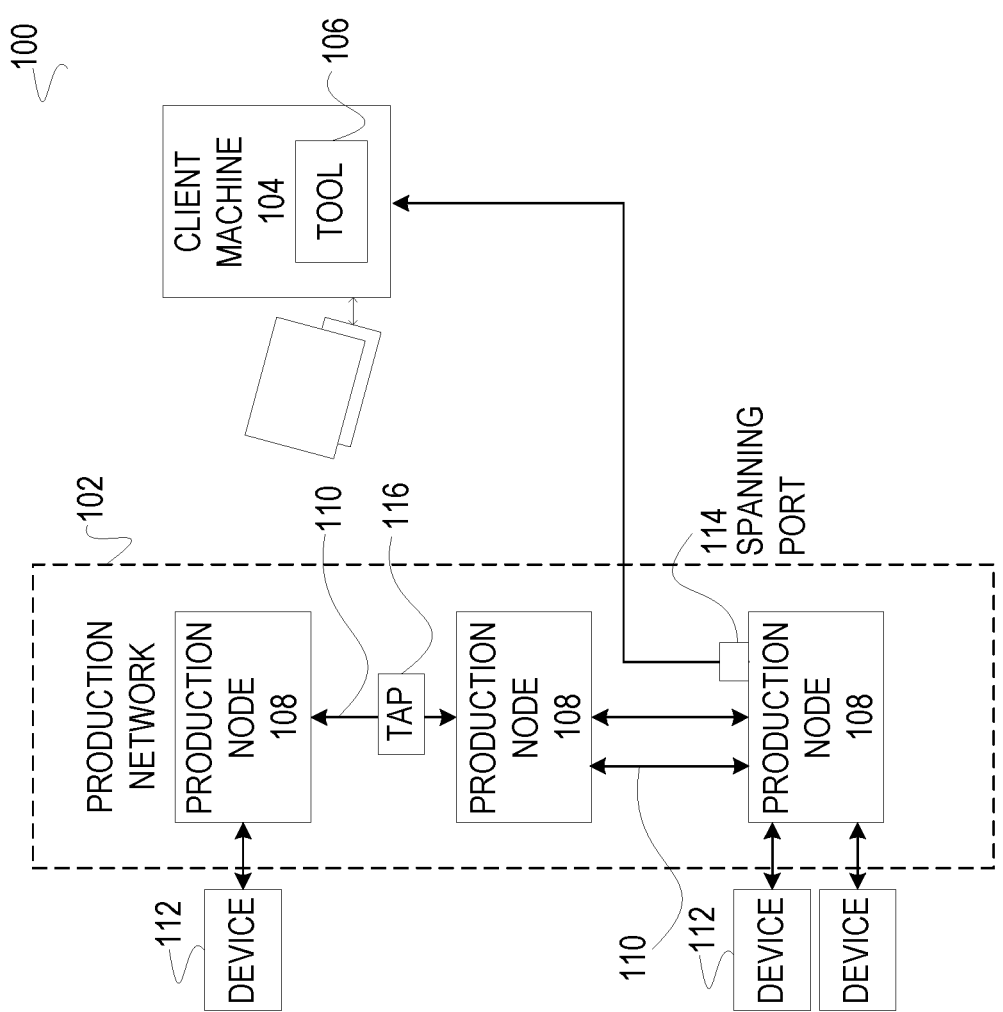
FIG. 1 is a block diagram illustrating a system, according to an embodiment, to monitor traffic information.

FIG. 1 is a block diagram illustrating a system 100, according to an embodiment, to monitor traffic information. The system 100 is found in the prior art and is associated with deficiencies. The system 100 may include a production network 102 for communicating traffic information and a client machine 104 including a tool 106 (e.g., tool module) that is utilized to monitor the traffic information on the production network 102. The production network 102 may include production nodes 108 (e.g., switching machines) that are connected with production links 110. The production links 110 may be used to communicate the traffic information (e.g., north/south direction) among the production nodes 108. The production network 102 may further include devices 112 that are connected to the production network 102 that may originate and/or terminate the traffic information. For example, a device 112 may originate traffic information (e.g., packets, frames, etc.) that is received by a production node 108 at the top of the production network 102 that, in turn, communicates the traffic information over a production link 110 to a production node 108 in the middle of the production network 102 that, in turn, communicates the traffic information over a production link 110 to a production node 108 at the bottom of the production network 102 that, in turn, communicates the traffic information to a connecting device 112.

The production network 102 may further include monitoring mechanisms in the form of a spanning port 114 and a tap 116. Nevertheless, one having ordinary skill in the art recognizes that the number and placement of monitoring mechanisms is not limited. The spanning port 114 is located on the production node 108 at the bottom the production network 102. The spanning port 114 may be configured by an administrator of the production network 102 to communicate a duplicate of the traffic information to the client machine 104, where it is received by the tool 106. The administrator may configure a duplication of the traffic information to be performed at designated access point in the production network 102. For example, the designated access points may include a port on a production node 108 for transmitting traffic information to a device 112, a port on a production node 108 for receiving traffic information from a device 112, a port on a production node 108 for receiving traffic information from a production link 110, and a port on a production node 108 for transmitting traffic information over a production link 110. For example, the administrator may configure a duplication of the traffic information that is being received from the device 112 that is connected the production node 108 at the top of the production network 102 and a forwarding of the duplicated traffic information to the spanning port 114. Further, for example, the administrator may configure a duplication of the traffic information that is being received from both devices 112 that are connected to the production node 108 at the bottom of the production network 102 and a forwarding of the duplicated traffic information to the spanning port 114. Further, for example, the administrator may configure a duplication of the traffic information that is being received from the production links 110 that are connected to any of the production nodes 108 and a forwarding of the duplicated traffic information to the spanning port 114.

The tap 116 is located on a production link 110 connecting the production node 108 at the top of the production network 102 with the production node 108 in the middle of the production network 102. The tap 116 may be configured by an administrator of the production network 102 to communicate to the client machine 104 a duplicate of the traffic information that is being communicated in either or both directions over the production link 110.

The system 100 is associated with deficiencies. First, the tool 106 cannot be connected to the tap 116 and the spanning port 114 at the same time. Rather, the tool 106 is connected to one monitoring mechanism at a time. Second, disconnect and reconnect operations may result in the dispatch of service personnel to site. Third, the traffic information is being communicated to the tool 106 without filtration. Fourth, the tools 106 are generally expensive (e.g., $10K). Accordingly, a supply of tools 106 adequate for a desired level of service may be prohibited by budget.

The production network 102 may be embodied as an enterprise network, a global network, a regional network, multiple sub-networks, public networks (e.g., Internet), private networks, and the like. The production network 102 may include one or more proprietary networks. The production network 102 may be operated by different legal entities and comprised of equipment provided by different vendors. The production network 102 may include one or more local area networks (LANs), one or more wide area networks (WANs), and/or other types of networking technologies that are used to interconnect the devices 112. The production network 102 may be embodied in any topology. Each production node 108 may include one or more server machines, routers, bridges, and/or other computing devices to facilitate transmission of the traffic information. The production links 110 may utilize T1, E1, Synchronous Optical Networking (SONET), Digital Subscriber Line (DSL), or any other transmission technology that facilitates the communication of the traffic information. The devices 112 may originate and/or terminate any type of traffic information including voice, data, multimedia, or the like. The tool 106 may be embodied as passive performance analytic tools, passive security analytic tools, and the like. The passive performance analytic tools may include a service assurance analyzer, an application performance analyzer, a unified communications voice over Internet protocol analyzer, a web monitor, and the like. The passive security analytic tools may include a network discovery analyzer, a flow data analyzer, a metadata analyzer, a data recorder, a network forensics analyzer, a lawful interceptor, a data loss preventer, a compliance audit monitor, and the like.

FIG. 2A is a block diagram illustrating a duplication 200, according to example embodiments, of traffic information 201. The duplication 200 may be of the traffic information 201 being communicated in one or both directions over the tap 116. For example, a magnification "×1" of the tap 116 illustrates the duplication of the traffic information 201 that is being communicated in a northerly direction 202, as illustrated in FIG. 2B. Further, for example, a magnification "×2" of the tap 116 illustrates the duplication of the traffic information 201 that is being communicated in a southerly direction 204, as illustrated in FIG. 2C.

FIG. 2B is a block diagram illustrating a duplication 203, according to example embodiments, of the traffic information 201. The duplication 203 includes the magnification "×1" (e.g., see also FIG. 2A) of traffic information 201 that is being communicated in the northerly direction 202. Specifically, the magnification "×1" illustrates the traffic information 201, in the form of packets "A," "B," and "C," as being duplicated by the tap 116 before being communicated by the tap 116 to the tool 106 (not shown).

FIG. 2C is a block diagram illustrating a duplication 205, according to example embodiments, of the traffic information 201. The duplication 205 includes the magnification "×2" (e.g., see also FIG. 2A) of the traffic information 201 that is being communicated in the southerly direction 204. Specifically, the magnification "×2" illustrates the traffic information 201, in the form of packets "D," "E," and "F," as being duplicated by the tap 116 before being communicated by the tap 116 to the tool 106 (not shown).

Figure 3B:
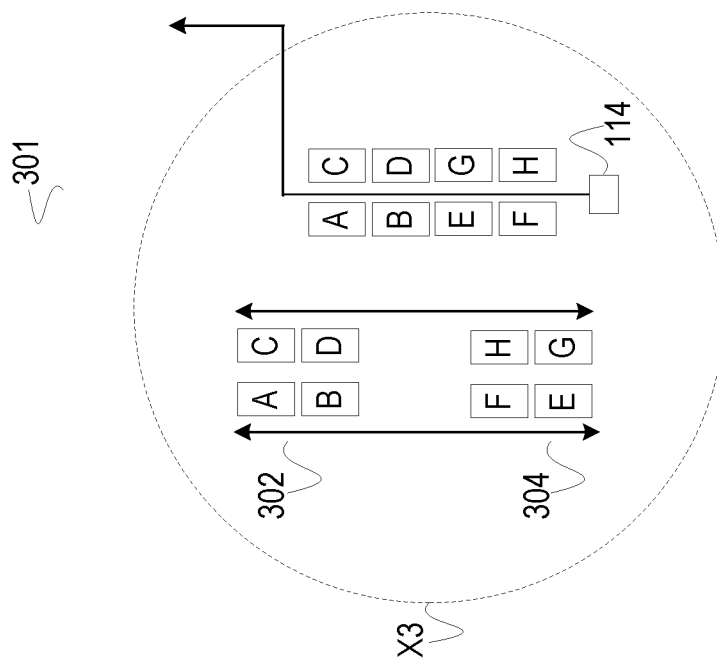
FIG. 3B is a block diagram illustrating duplication of traffic information, according to example embodiments.
Figure 3A:
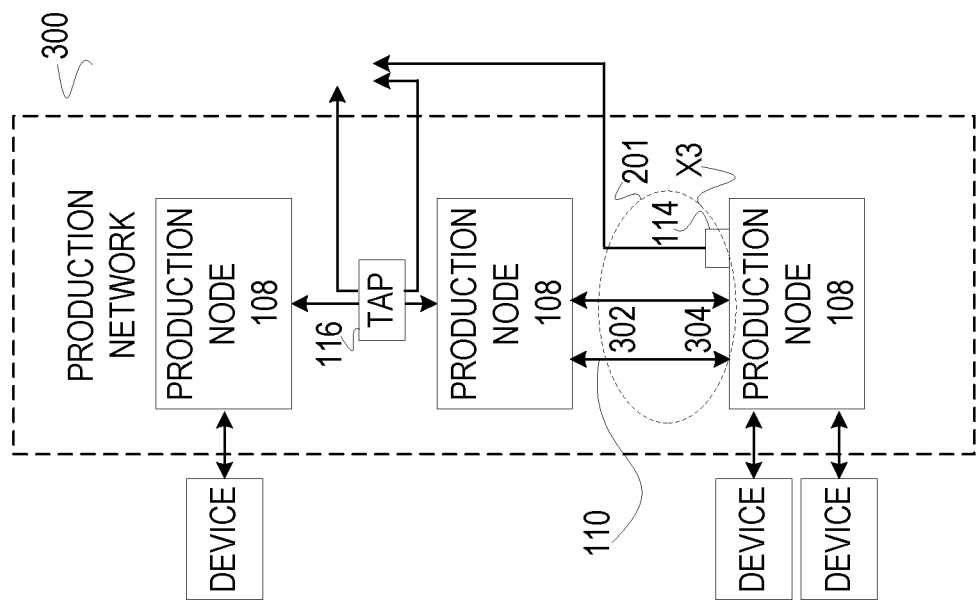
FIG. 3A is a block diagram illustrating duplication of traffic information, according to example embodiments.

FIG. 3A is a block diagram illustrating a duplication 300, according to example embodiments of the traffic information 201. The duplication 300 of the traffic information 201 may be performed in one or both directions for the two production links 110 connecting the production node 108 in the middle and the production node 108 on the bottom. A magnification "×3" of the spanning port 114 illustrates the duplication 300 of the traffic information 201 being performed in a northerly direction 302 over both production links 110 and the duplication 300 being performed in a southerly direction 304 over the same two production links 110. The magnification "×3" is further illustrated in FIG. 3B.

FIG. 3B is a block diagram illustrating a duplication 301, according to example embodiments of the traffic information 201. The duplication 301 of the traffic information 201 may be performed in one or both directions for the two production links 110 connecting the production node 108 in the middle and the production node 108 on the bottom. The magnification ×3 (e.g., see also FIG. 3A) of the spanning port 114 illustrates the duplication 301 of the traffic information 201 being performed in a northerly direction 302 over both production links 110 and the duplication 301 being performed in a southerly direction 304 over the same two production links 110. For example, the traffic information 201 being communicated in the northerly direction 302 over first (e.g., packet "A" and "packet B") and second (e.g., packet "C" and packet "D") production links 110 may be duplicated before being communicated over the spanning port 114 to the tool 106 (not shown). Further, for example, the traffic information 201 being communicated in the southerly direction 304 over first (e.g., packet "E" and packet "F") and second (e.g., packet "G" and packet "H") production links 110 may be duplicated before being communicated over the spanning port 114 to the tool 106 (not shown).

Figure 4:
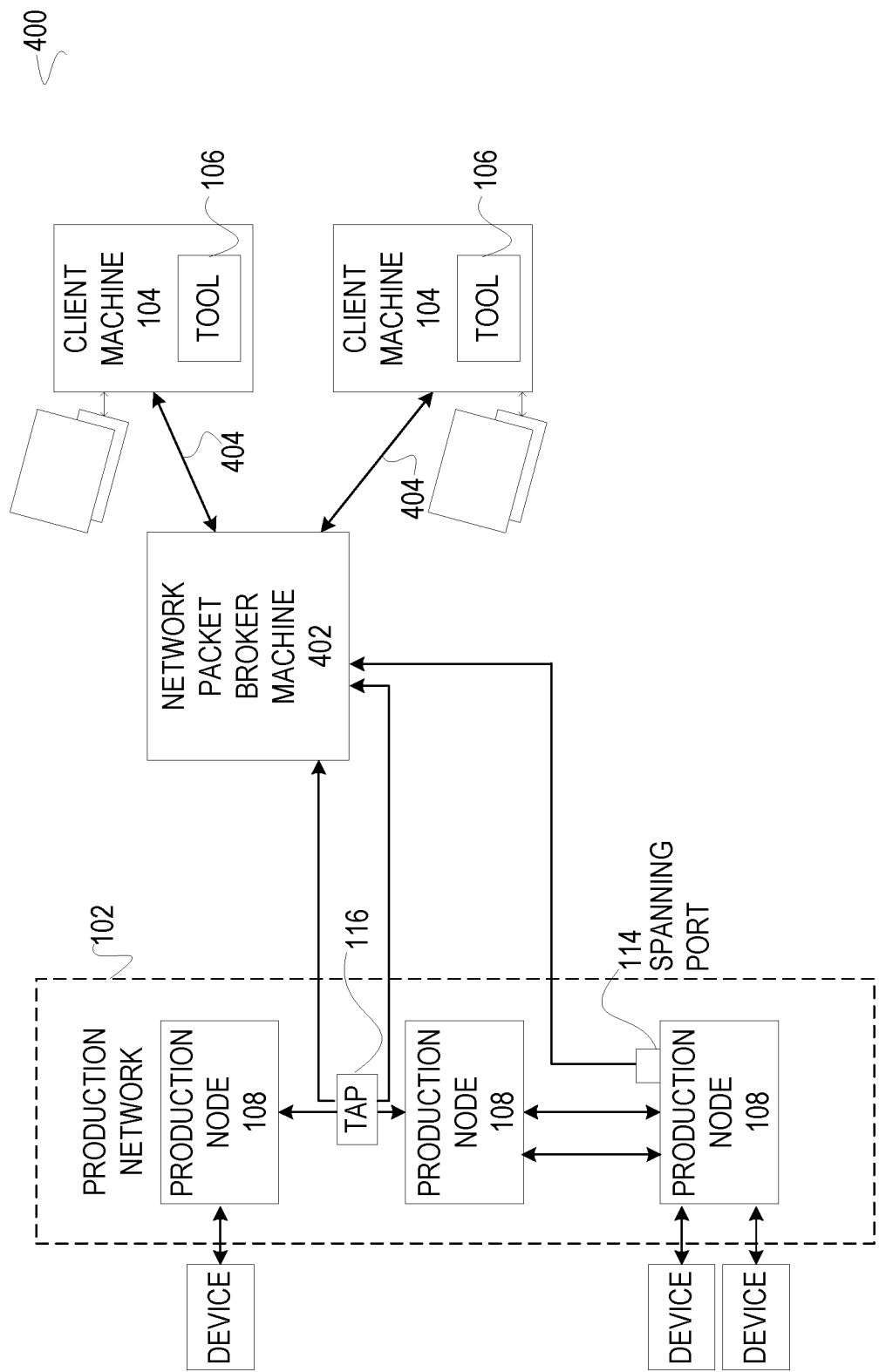
FIG. 4 is a block diagram illustrating a system, according to an embodiment, to monitor traffic information.

FIG. 4 is a block diagram illustrating a system 400, according to an embodiment, to monitor traffic information. The system 400 is associated with deficiencies. The system 400 may include a network packet broker machine 402 (e.g., network packet broker). The system 400 exhibits an improvement over the system 100; nevertheless, the network packet broker machine 402 (e.g., network packet broker) has the disadvantage of connecting only a small number of production nodes 108 to a few tools 106, making it unsuitable for monitoring a large production network 102.

Figure 5:
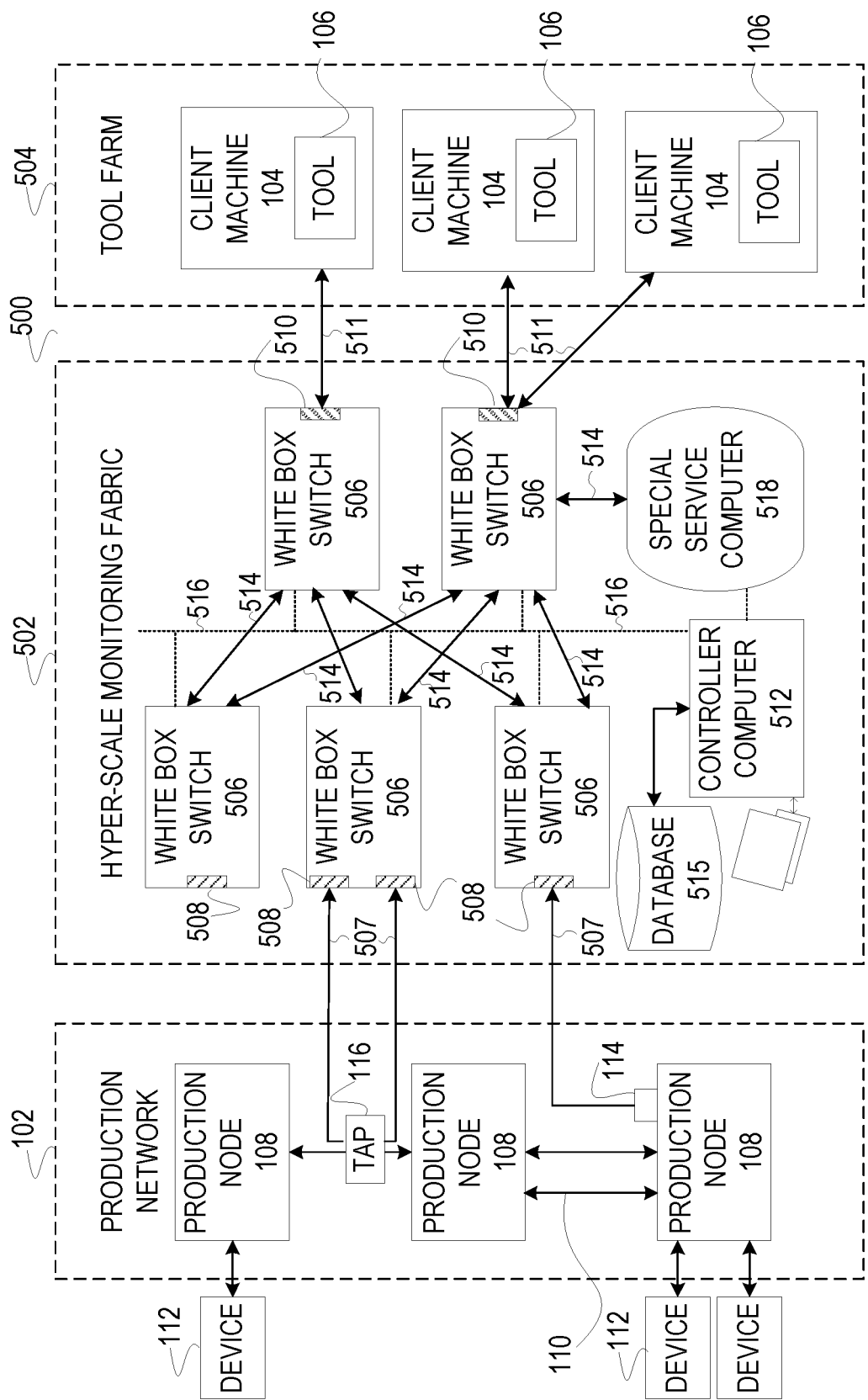
FIG. 5 is a block diagram illustrating a system, according to an embodiment, to build a hyper-scale monitoring fabric.

FIG. 5 is a block diagram illustrating a system 500, according to an embodiment, to build a hyper-scale monitoring fabric. The system 500 may include a production network 102, a hyper-scale monitoring fabric 502, and a tool farm 504. The production network 102 is as previously described. The tool farm 504 may include one or more client machines 104 each including one or more tools 106. The hyper-scale monitoring fabric 502 may be utilized by the tools 106 in the tool farm 504 to monitor a duplicate of any traffic information 201 in the production network 102. Accordingly, the hyper-scale monitoring fabric 502 enables any tool 106 in the tool farm 504 to monitor any duplicate of the traffic information 201 received by the hyper-scale monitoring fabric 502.

The traffic information 201 may generally flow north (e.g., top of FIG. 5) to south (e.g., bottom of FIG. 5) and/or south to north in the production network 102. In contrast, the traffic information 201 flows from west (e.g., left side of FIG. 5) to east (e.g., right side of FIG. 5) over the hyper-scale monitoring fabric 502 where it is monitored at the tool farm 504. The traffic information 201 does not flow from east to west over the hyper-scale monitoring fabric 502 as the hyper-scale monitoring fabric 502 is solely for monitoring the traffic information 201 in the production network 102. To this end, the hyper-scale monitoring fabric 502 may include a plurality of white box switches 506 that are connected together with fabric links 514, a control link 516 that connects each of the white box switches 506 with a controller computer 512, a database 515, and a monitor that is communicatively coupled to the controller computer 512, and a special service computer 518. A duplicate of the traffic information 201 may be received over ingress links 507 at ingress interfaces 508 of the white box switches 506 that, in turn, forward the traffic information 201 via one or more white box switches 506 in an easterly direction to exit the hyper-scale monitoring fabric 502 through egress interfaces 510 that are connected to egress links 511 that, in turn, are connected to the client machines 104 in the tool farm 504.

The white box switches 506 may be configured by the controller computer 512 in a number of ways. First, the white box switches 506 may be configured by the controller computer 512 to receive the traffic information 201 at a particular ingress interface 508 and to forward the traffic information 201 over the fabric links 514 connecting the white box switches 506 to exit the hyper-scale monitoring fabric 502 at a particular egress interface 510. Accordingly, the white box switches 506 may be configured by the controller computer 512 to forward the traffic information 201 to the appropriate tool 106 notwithstanding the location of the tool 106 or the location of the monitoring mechanism (e.g., tap 116, spanning port 114).

Second, the white box switches 506 may be configured by the controller computer 512 to receive the traffic information 201 at a particular ingress interface 508 and to communicate the traffic information 201 over the control link 516 to the controller computer 512 that, in turn, stores the traffic information 201 in the database 515. In some embodiments, the controller computer 512 may further communicate the traffic information 201 to the special service computer 518, as described below. The controller computer 512 may be utilized to perform a forensic analysis on the traffic information 201 as being received or as stored. For example, the controller computer 512 may facilitate the querying of traffic information 201 in the database 515 to display the traffic information 201 and to characterize the traffic information 201, as described later in this document. It will be appreciated that the characterizing of the traffic information 201 may be utilized to facilitate an optimal building of the hyper-scale monitoring fabric 502 to enhance the monitoring of the traffic information 201 by the tool farm 504.

Third, the white box switches 506 may be configured by the controller computer 512 to communicate the traffic information 201 to the special service computer 518 and to receive the traffic information 201 from the special service computer 518. Accordingly, the white box switches 506 may be configured by the controller computer 512 to forward the traffic information 201 through the special service computer 518 before the traffic information 201 is forwarded over the hyper-scale monitoring fabric 502 via one or more white box switches 506 to exit at a particular egress interface 510. Forwarding the traffic information 201 to the special service computer 518 may facilitate removal by the special service computer 518 of duplicate traffic information 201 resulting from the ubiquitous placement of monitoring mechanisms (e.g., taps 116, spanning ports 114) in the production network 102. Forwarding the traffic information 201 to the special service computer 518 may further facilitate time-stamping of the traffic information 201 by the special service computer 518. In one embodiment, the special service computer 518 may further communicate the time-stamped traffic information 201 over the control link 516 to the controller computer 512 that, in turn, stores the time-stamped traffic information 201 in the database 515 for subsequent forensic analysis, described later in this document.

Fourth, the white box switches 506 may be configured by the controller computer 512 to filter the traffic information 201 that is received at an ingress interface 508. For example, the white box switches 506 may be configured by the controller computer 512 to filter the traffic information 201 (e.g., packets) based on traffic type (e.g., web traffic), internet protocol source address, or any other traffic information 201, as described later in this document.

The white box switches 506 and the special service computer 518 may be configured by the controller computer 512 by utilizing the control link 516. For example, the controller computer 512 may communicate configuration information over the control link 516 to a white box switch 506 that, in turn, receives the configuration information and utilizes the configuration information to configure the operation of the white box switch 506. Further, for example, the controller computer 512 may communicate the configuration information over the control link 516 to the special service computer 518 that, in turn, receives the configuration information and utilizes the configuration information to configure operation of the special service computer 518. The hyper-scale monitoring fabric 502 may be scaled. Accordingly, one having ordinary skill in the art will recognize that the number of white box switches 506 may be increased to expand the capacity and interconnectivity of the hyper-scale monitoring fabric 502.

Broadly, the system 500 to build a hyper-scale monitoring fabric 502 may operate as follows. The hyper-scale monitoring fabric 502 may receive a duplicate of a first portion of traffic information 201 from a production network 102 as first traffic information 201. For example, the first traffic information 201 may originate at multiple monitoring mechanisms (e.g., taps 116, spanning ports 114) that are configured or manually inserted by an administrator for the production network 102. The first traffic information 201 may be received over ingress links 507 by the hyper-scale monitoring fabric 502, at ingress interfaces 508, and by white box switches 506. The white box switches 506, in turn, may communicate the first traffic information 201 over the control link 516 to the controller computer 512 that, in turn, stores the first traffic information 201 in the database 515. The controller computer 512 may utilize the first traffic information 201 that is stored in the database 515 to configure multiple (e.g., a second plurality of) white box switches 506 in the hyper-scale monitoring fabric 502 to forward a second portion of the traffic information 201, as second traffic information 201, to the tool farm 504. For example, an administrator may identify a particular type of traffic (e.g., web traffic) based on a forensic analysis of the first traffic information 201 that is stored in the database 515. That is, the administrator may identify that a particular type of traffic is for further analysis by a tool 106 in the tool farm 504. In response to the configuration of the white box switches 506, the hyper-scale monitoring fabric 502 may begin receiving a duplicate of the second portion of the traffic information 201 from the production network 102, as second traffic information 201. The second traffic information 201 may be received at a first ingress interface 508 and forwarded in the hyper-scale monitoring fabric 502 with the second plurality of white box switches 506 over one or more egress interfaces 510 to a tool farm 504 including plurality of tools 106 that are utilized to monitor the traffic information 201 that originated in the production network 102.

Figure 6:
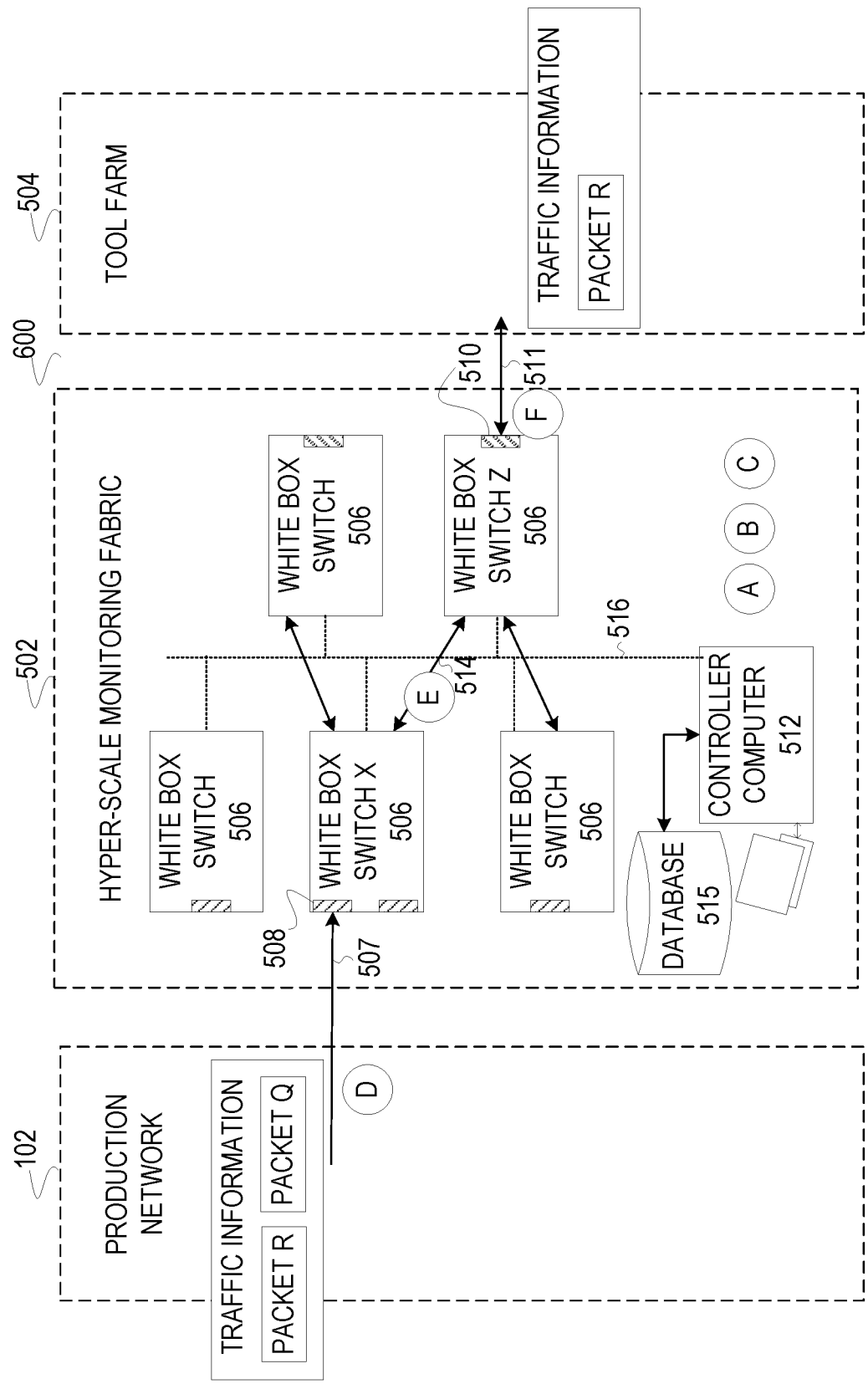
FIG. 6 is a block diagram illustrating a system, according to an embodiment, to build a hyper-scale monitoring fabric.

FIG. 6 is a block diagram illustrating a system 600, according to an embodiment, to build a hyper-scale monitoring fabric. The system 600 illustrates, in further detail, the controller computer 512 configuring the filtering and forwarding of traffic information 201 and the filtering and forwarding of the traffic information 201.

Configuring Filtering and Forwarding

At operation "A," the controller computer 512 may communicate configuration information over the control link 516 to the white box switch "X" 506. For example, according to an embodiment, the configuration information may be received and executed by the white box switch "X" 506 to configure the white box switch "X" 506 to filter the traffic information 201 entering the white box switch "X" 506 at the upper ingress interface 508 to match the traffic type "web traffic." At operation "B," according to an embodiment, the controller computer 512 may communicate configuration information over the control link 516 to the white box switch "X" 506 that configures the white box switch "X" 506 to forward matching traffic information 201 to the white box switch "Z" 506. Accordingly, the configuration information may be utilized to configure the white box switch "X" 506 to receive traffic information 201 on the upper ingress interface 508, identify a matching type of traffic information 201 (e.g., web traffic), and forward the matching traffic information 201 over the fabric link 514 that is connected to the white box switch "Z" 506. At operation "C," the controller computer 512 may communicate configuration information over the control link 516 to the white box switch "Z" 506 to forward the traffic information 201 that is being received on the fabric link 514 connected to the white box switch "X" 506 onto the egress link 511. For example, the configuration information may be utilized to configure the white box switch "Z" 506 to receive traffic information 201 on the fabric link 514 connected to the white box switch "X" 506 and to forward the traffic information 201 out the egress interface 510 onto the egress link 511.

Filtering and Forwarding

At operation "D," the white box switch "X" 506 may receive the traffic information 201 entering at the upper ingress interface 508 and filter the traffic information 201. For example, the white box switch "X" 506 may receive "PACKET Q" and "PACKET R" on the upper ingress interface 508 and identify the field for traffic type in the "PACKET R" as matching the traffic type of "web traffic" and identify the field for traffic type in the "PACKET Q" as NOT matching the traffic type of "web traffic." At operation "E," the white box switch "X" 506 forwards the matching "PACKET R" over the fabric link 514 connected to the white box switch "Z" 506 in response to identifying the match. At operation "F," the white box switch "Z" 506 forwards the "PACKET R" that is received on the fabric link 514 connected to the white box switch "X" 506 out the egress interface 510 onto the egress link 511.

FIG. 7 is a block diagram illustrating a system 700, according to an embodiment, to build a hyper-scale monitoring fabric. The system 700 further illustrates components and operation of the white box switch 506. The white box switch 506 may be acquired from a vendor as a generic switch (e.g., Ethernet) without a network operating system or software applications, thereby enabling the purchaser to install a network operating system and software applications of their choice. Alternatively, the white box switch 506 may be acquired from a vendor that includes the network operating system and/or software applications. Nevertheless, the choice remains with the purchaser. The network operating system and the software applications enable the white box switch 506 to switch (e.g., forward) traffic information 201. To this end, the white box switch 506 may include a receiving module 702, a processing module 704, filtering information 706, and a switching mesh 708 (e.g., application specific integrated circuit (ASIC)). The receiving module 702 may receive the configuration information from the controller computer 512. The processing module 704 may utilize the configuration information to configure the switching mesh 708. Merely for example, the white box switch 506 may include ports that are numbered from the top left, moving clockwise, including a first ingress interface 508 at port "0," a first fabric link 514 at port "1," a second fabric link 514 at port "2," a third fabric link 514 at port "3," and a second ingress interface 508 at port "4." Accordingly, the processing module 704 may utilize the port numbering scheme and the configuration information to forward the traffic information 201. Other port numbering schemes are also appropriate.

Illustrated on the left is traffic information 201 in the form of a packet including a header, payload, and trailer. The contents of the packet may be matched as a precondition for forwarding. One having ordinary skill in the art recognizes that standard byte and bit offsets from the beginning of the packet contain protocol-specific information that may be matched. To this end, the receiving module 702 may receive the configuration information and the processing module 704 may utilize the configuration information to program the switching mesh 708 to match the protocol-specific information. In addition, the switching mesh 708 may be programmed to match non-protocol-specific information. Further, the processing module 704 may program the switching mesh 708 to identify whether the filtering information 706 in the form of a first parameter matches the contents of the payload of a packet. More specifically, the switching mesh 708 may identify whether configuration information in the form of a first parameter matches a third byte of a packet that is received on the first ingress interface 508 at port "0." The first parameter may include numeric, alphabetic (e.g., ASCII), or alphanumeric data. In some embodiments, the configuration information may include a rule that is used to filter (e.g., match) the traffic information 201. In some embodiments, the rule may include one or more Boolean operators. For example, the rule may identify a match based on the first parameter matching the third byte of the packet AND a second parameter matching a fifth byte of the packet. Other operators (e.g., OR, EXCLUSIVE OR, etc.) may be utilized. Further, for example, the processing module 704 may program the switching mesh 708 to perform an action in response to identifying a match. For example, the processing module 704 may program the switching mesh 708 to forward a packet out the second fabric link 514 at port "2" in response to identifying a match in the packet that is being received on the first ingress interface 508 at port "0." Further, according to some embodiments, the processing module 704 may program the switching mesh 708 to forward a packet out multiple ports in response to the identification of a match.

Figure 8:
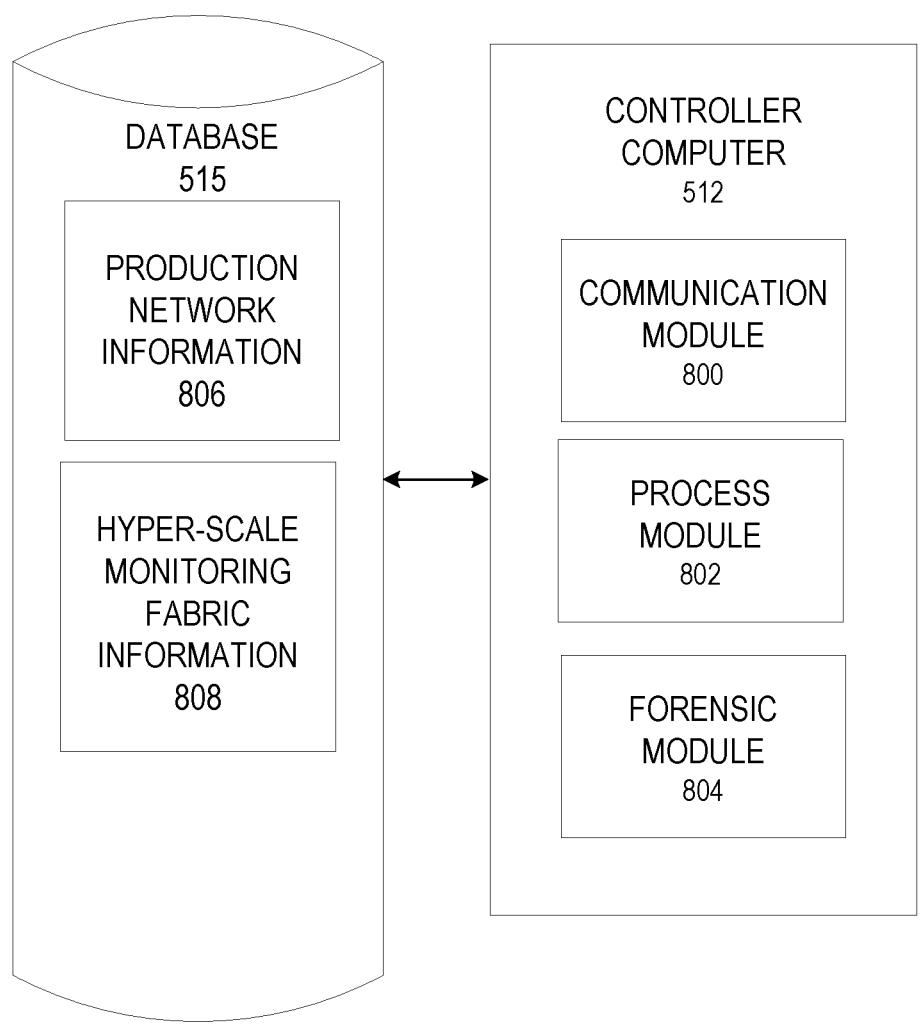
FIG. 8 is a block diagram illustrating a controller computer communicatively coupled to a database, according to an embodiment.

FIG. 8 is a block diagram illustrating the controller computer 512 communicatively coupled to the database 515, according to an embodiment. The controller computer 512 may include a communication module 800, a process module 802, and a forensic module 804. The communication module 800 may communicate with the white box switches 506 and the special service computer 518 over the control link 516. For example, the communication module 800 may communicate configuration information to the white box switches 506 and the special service computer 518. Further, the communication module 800 may receive traffic information 201 from the white box switches 506 and the special service computer 518. The process module 802 may store data to the database 515, retrieve data from the database 515, and facilitate the presentation of user interfaces for the configuration of the hyper-scale monitoring fabric 502. The forensic module 804 may be utilized to receive a command from the monitor, query the database 515, generate a user interface, and display the user interface on the monitor. The database 515 may include production network information 806 describing the production network 102 and hyper-scale monitoring fabric information 808 describing the hyper-scale monitoring fabric 502.

Figure 9A:
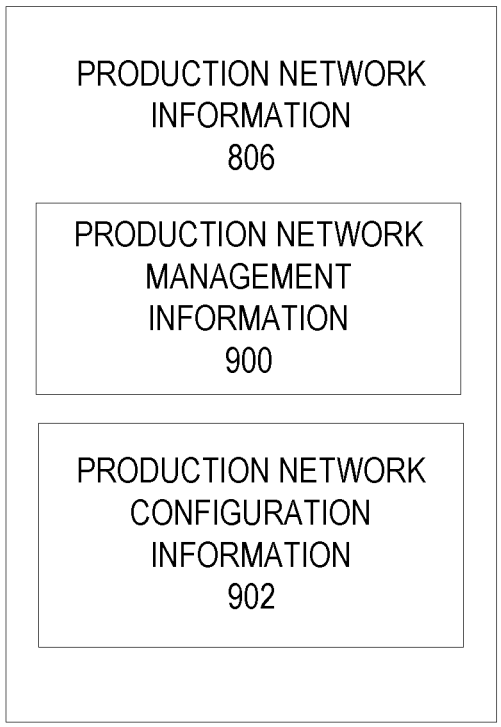
FIG. 9A is a block diagram illustrating production network information, according to an embodiment.

FIG. 9A is a block diagram illustrating production network information 806, according to an embodiment. The production network information 806 describes the production network 102 and includes the production network management information 900 and production network configuration information 902.

Figure 9B:
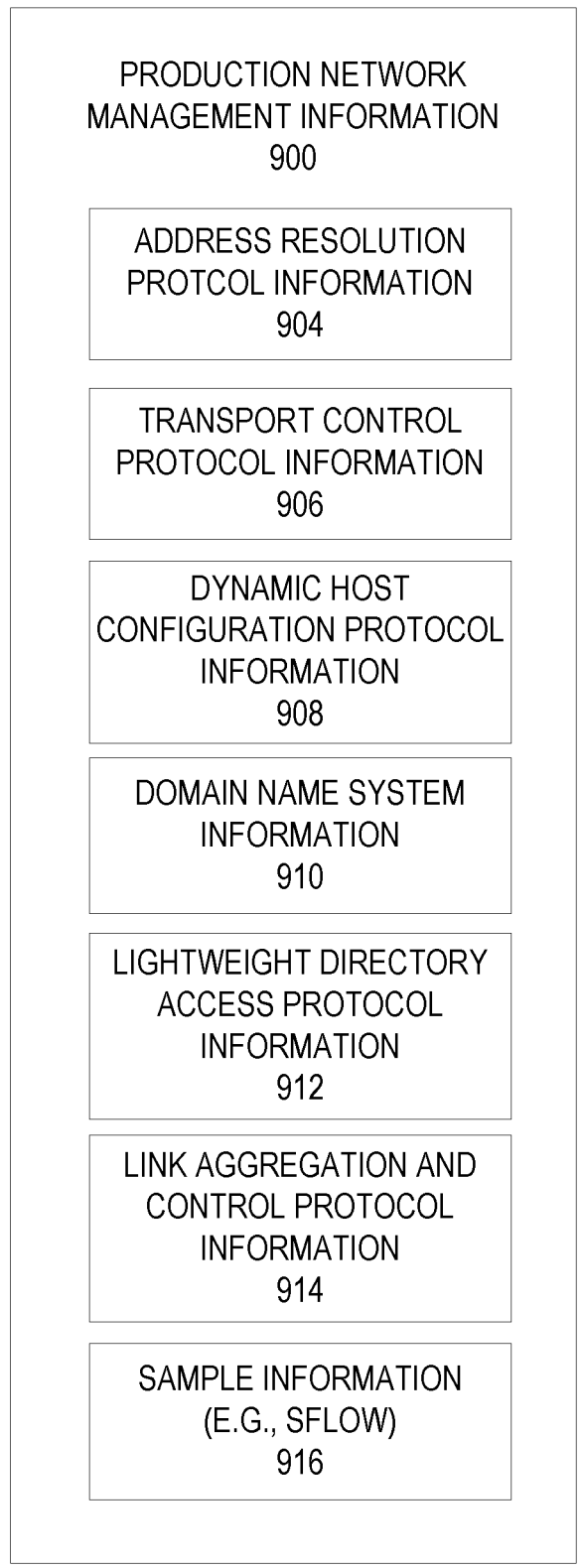
FIG. 9B is a block diagram illustrating production network management information, according to an embodiment.

FIG. 9B is a block diagram illustrating production network management information 900, according to an embodiment. The production network management information 900 generally includes protocol information that is received from the production network 102. The protocol information may include protocol messages and other information that is being communicated in the production network 102. Further, each protocol message that is stored as production network management information 900 may be associated with a white box switch identifier that identifies a white box switch 506 in the hyper-scale monitoring fabric 502, an ingress interface identifier that identifies an ingress interface 508 in the hyper-scale monitoring fabric 502, and a monitoring mechanism identifier that identifies a monitoring mechanism (e.g., spanning port 114, tap 116) in the production network 102. The white box switch identifier, ingress interface identifier, and monitoring mechanism identifier describe a path to an access point in the production network 102 that was utilized to receive the traffic information 201 that includes the protocol message. For example, the monitoring mechanism identifier may identify the monitoring mechanism (e.g., spanning port 114, tap 116) that received the protocol message from the production network 102, the ingress interface identifier may identify the ingress interface 508 that received the protocol message, and the white box switch identifier may identify the white box switch 506 that received the protocol message. The protocol information may be time-stamped. For example, the protocol information may be time-stamped with a date and time of receipt, as recorded by the special service computer 518.

The production network configuration information 902 may include network elements in the production network 102. The production network configuration information 902 may be identified based on the production network management information 900.

The production network management information 900 may include address resolution protocol (ARP) information 904 (e.g., ARP protocol messages), transport control protocol (TCP) information 906 (e.g., TCP protocol messages), dynamic host configuration protocol (DHCP) information 908 (e.g., DHCP protocol messages), domain name system (DNS) information 910 (e.g., DNS protocol messages), lightweight directory access protocol (LDAP) information 912 (e.g., LDAP protocol messages), link aggregation control protocol (LACP) information 914 (e.g., LACP protocol messages), and sample information 916 (e.g., Sflow®) (e.g., sample messages).

The ARP information 904 may be received from the production network 102, as traffic information 201, and stored in the database 515. ARP is a network layer protocol used to convert an Internet protocol (IP) address into a physical address, such as an Ethernet address (e.g., media access control (MAC) address). A host wishing to obtain a physical address broadcasts an ARP request onto the TCP/IP network. The host on the network that has the IP address in the request then replies with its physical hardware address. Accordingly, the ARP information 904 may include an IP address associated with a physical address, such as an Ethernet address (e.g., MAC address).

The TCP information 906 may be received from the production network 102, as traffic information 201, and stored in the database 515. TCP enables two hosts to establish a connection and exchange streams of data. TCP guarantees delivery of data and also guarantees that packets will be delivered in the same order in which they were sent.

The DHCP protocol information 908 may be received from the production network 102, as traffic information 201, and stored in the database 515. DHCP assigns dynamic IP addresses to devices on a network, assigning a different IP address every time a device connects to the network.

The DNS information 910 may be received from the production network 102, as traffic information 201, and stored in the database 515. The DNS is an Internet service that translates domain names into IP addresses.

The LDAP information 912 may be received from the production network 102, as traffic information 201, and stored in the database 515. LDAP is a set of protocols for accessing information directories based on the standards contained within the X.500 standard, but is significantly simpler.

The LACP information 914 may be received from the production network 102, as traffic information 201, and stored in the database 515. LACP may be utilized to identify traffic information 201 that is being communicated over two physical communication links (e.g., production links 110) as being communicated over a single logical communication link.

The sample information (e.g., Sflow®) 916 may be received from the production network 102, as a sampling of the traffic information 201 that is being communicated over the production network 102. The sampling of the traffic information 201 may be stored in the database 515. The sampling of the traffic information 201 may utilize machine learning algorithms including a K-Means learning algorithm, a Naive Bayes Filter machine learning algorithm, a C4.5 machine learning algorithm, a C5.0 machine learning algorithm, a J48 machine learning algorithm, and/or a random forest machine learning algorithm. Merely for example, the machine learning algorithm may be embodied as sFlow®, an industry standard technology for monitoring high speed switched networks. sFlow® may provide visibility into the utilization of networks enabling performance optimization, accounting/billing for usage, and defense against security threats.

Figure 9C:
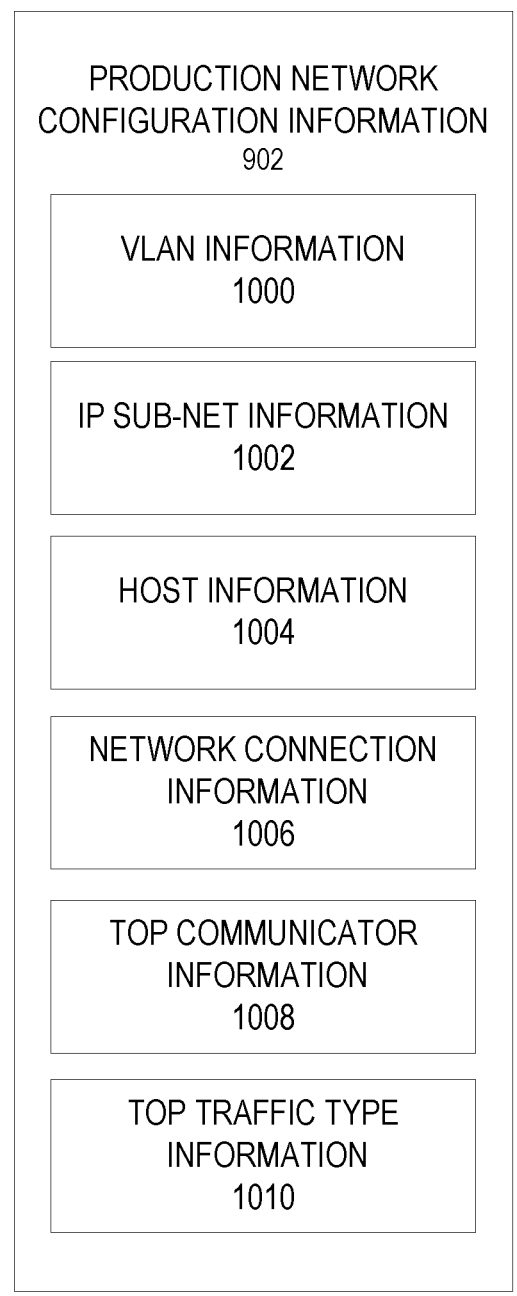
FIG. 9C is a block diagram illustrating production network configuration information, according to an embodiment.

FIG. 9C is a block diagram illustrating the production network configuration information 902, according to an embodiment. The production network configuration information 902 describes network elements in the production network 102. The production network configuration information 902 may be generated based on the production network management information 900. For example, the process module 802 may generate the production network configuration information 902 based on the production network management information 900. The production network configuration information 902 may include virtual local area network (VLAN) information 1000, IP sub-net information 1002 (e.g., Internet protocol (IP) subnet protocol information), host information 1004, network connection information 1006, top communicator information 1008, and top traffic type information 1010.

The VLAN information 1000 may describe LANs in the production network 102. The VLAN information 1000 may be generated based on the production network management information 900. A VLAN is a group of end stations (e.g., devices 112) with a common set of specifications, independent of the physical location of the end stations. VLANs may include the same attributes as physical LANs but enable the grouping of end stations (e.g., devices 112) notwithstanding the physical location of the end station not being on the same LAN segment. The VLAN information 1000 may include device identifiers and LAN identifiers. The VLAN information 1000 may be generated by the process module 802 based on the production network management information 900 and may be utilized by the forensic module 804 to generate and display portions of the user interfaces described in FIG. 12 through FIG. 18.

The IP subnet protocol information 1002 may describe IP sub-networks in the production network 102. The IP subnet protocol information 1002 may be generated based on the production network management information 900. A sub-network, or subnet, is a logical, visible subdivision of an IP network. The practice of dividing a network into two or more networks is called subnetting. Accordingly, the IP subnet protocol information 1002 may associate each subnet with one or more devices (e.g., device 112) that are included in the subnet. The IP subnet protocol information 1002 may be generated by the process module 802 based on the production network management information 900 and may be utilized by the forensic module 804 to generate and display portions of the user interfaces described in FIG. 12 through FIG. 18.

The host information 1004 may describe hosts in the production network 102. The host information 1004 may be generated based on the production network management information 900. A host may include a device (e.g., device 112) that is utilized to provide access to a website or other data on the device (e.g., device 112). Accordingly, the host information 1004 may include a host name in association with an IP address, a media access control (e.g., MAC) address, a vendor identifier, a VLAN identifier, and other information. The host information 1004 may be generated by the process module 802 based on the production network management information 900 and may be utilized by the forensic module 804 to generate and display portions of the user interfaces described in FIG. 12 through FIG. 18.

The network connection information 1006 may describe network connections in the production network 102. The network connection information 1006 may be generated based on the production network management information 900. The network connection information 1006 may include a network address of a TCP client host, a name of the TCP client host (e.g., universal resource identifier), a network address of a TCP server host, and the name of the TCP server host (e.g., universal resource identifier). The network connection information 1006 may be generated by the process module 802 based on the production network management information 900 and may be utilized by the forensic module 804 to generate and display portions of the user interfaces described in FIG. 12 through FIG. 18.

The top communicator information 1008 may describe the top communicators in the production network 102. The top communicator information 1008 may be generated based on the production network management information 900. The top communicator information 1008 may include a list of most active hosts in the production network 102. For example, the top communicator information 1008 may include a list of the ten most active hosts in the production network 102. The most active hosts may be identified based on the number of connections, the length in time of the connections, and/or the number of packets originated or received. The top communicator information 1008 may be based on the other types of production network configuration information 902.

The top traffic type information 1010 describes the top types of traffic information 201 being communicated in the production network 102. The types of traffic information 201 in the production network 102 may include database traffic (e.g., query and response), web traffic, voice traffic, and other applications and services. Further, the types of traffic information 201 may be classified according to classifiers including port number, deep packet inspection, statistical classification, and the like. The port type of traffic information 201 may include traffic information 201 that is transmitted from a port or received on a port. The port type of traffic information 201 may be classified according to speed, applications and services, and other classifiers. The deep packet inspection type of traffic information 201 may include traffic information 201 that is identified based on a packet inspection of the payload of the packet. Deep packet inspection may detect applications and services regardless of the port number on which they originate or terminate. The statistical type of traffic information 201 may include traffic information 201 that is sampled from the traffic information 201. The statistical type of traffic information 201 may include a statistical analysis of attributes, including a statistical analysis of byte frequencies, a statistical analysis of packet sizes, and a statistical analysis of packet inter-arrival times. The top traffic type information 1010 may be generated by the process module 802 based on the production network management information 900 and may be utilized by the forensic module 804 to generate and display portions of the user interfaces described in FIG. 12 through FIG. 18.

Figure 10:
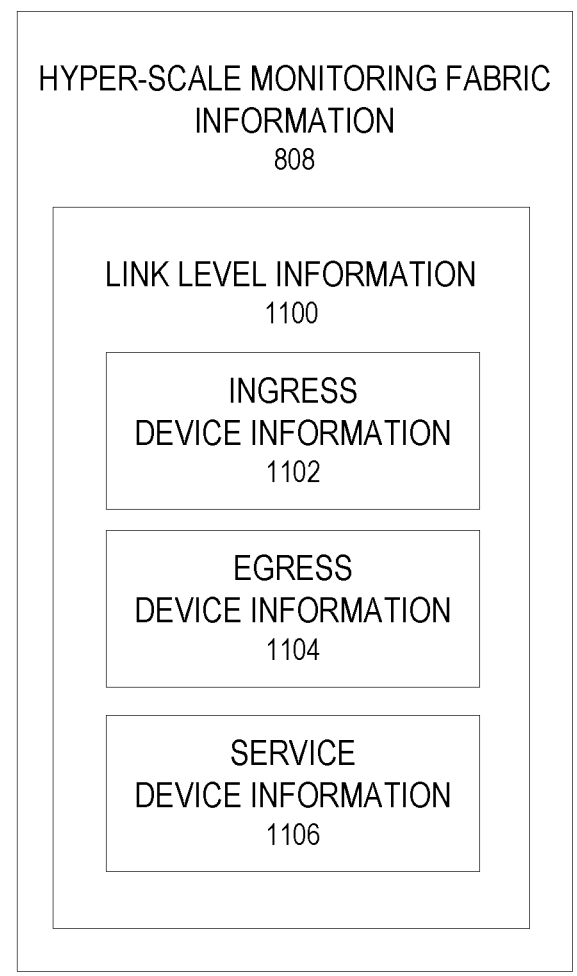
FIG. 10 is a block diagram illustrating hyper-scale monitoring fabric information, according to some example embodiments.

FIG. 10 is a block diagram illustrating the hyper-scale monitoring fabric information 808, according to some example embodiments. The hyper-scale monitoring fabric information 808 includes link level information 1100 that describes network elements that are immediately connected to the hyper-scale monitoring fabric 502. For example, the process module 802 may automatically detect physical devices connected to the ports on the hyper-scale monitoring fabric 502 by processing link-level protocol (LLP) packets. The hyper-scale monitoring fabric information 808 may include ingress device information 1102, egress device information 1104, and service device information 1106. The ingress device information 1102 may include device identifiers that identify devices (e.g., monitoring devices (e.g., taps 116, spanning ports 114)) connected to ingress interfaces 508. The egress device information 1104 may include device identifiers that identify devices connected to egress interfaces 510 (e.g., client machines 104). The service device information 1106 may include device identifiers that identify special service devices (e.g., special service computer 518) connected to the hyper-scale monitoring fabric 502.

Figure 11A:
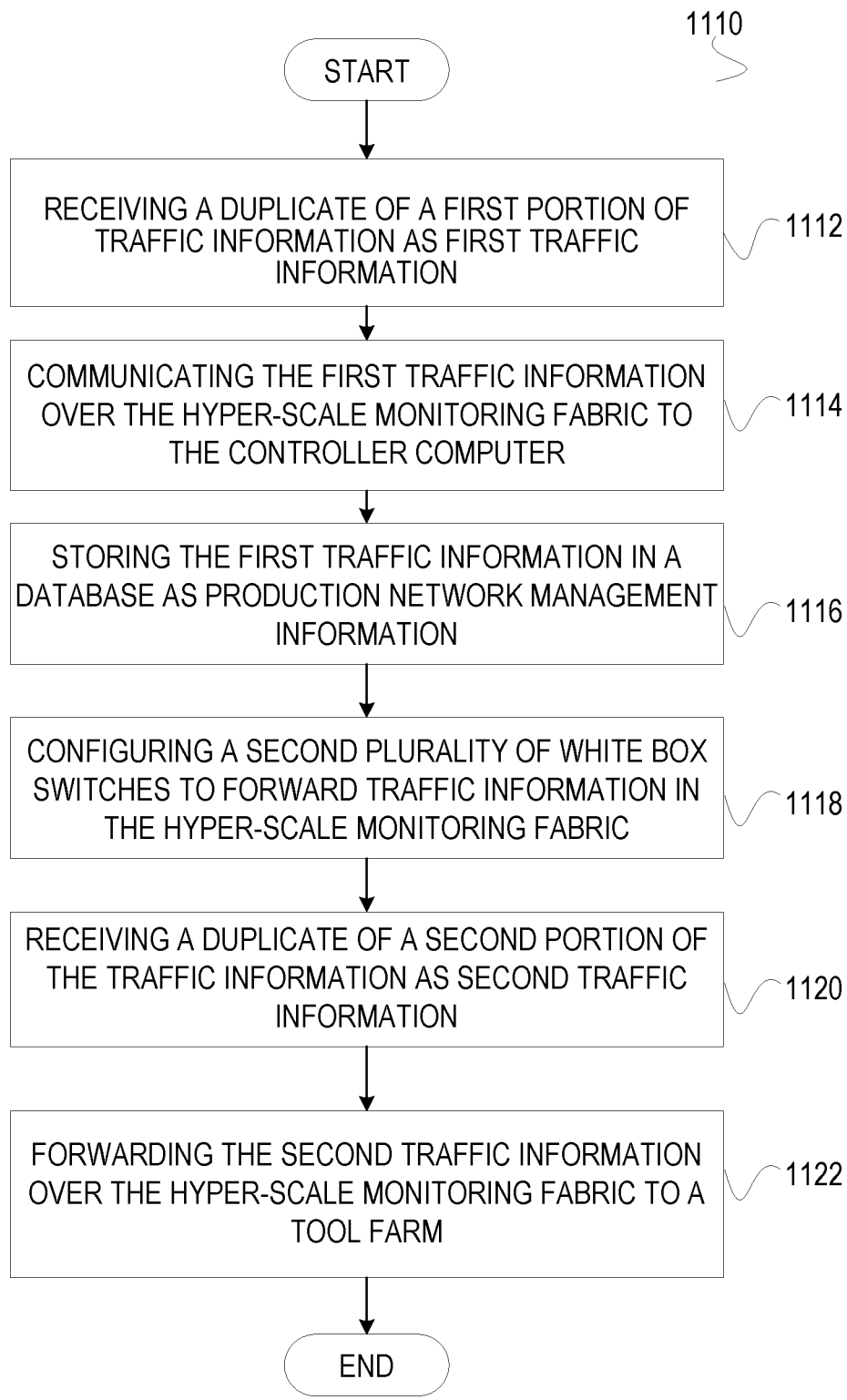
FIG. 11A is a flowchart illustrating a method, according to some example embodiments, to build a hyper-scale monitoring fabric.

FIG. 11A is a block diagram illustrating a method 1110, according to some example embodiments, to build a hyper-scale monitoring fabric 502. At operation 1112, the hyper-scale monitoring fabric 502 receives one or more duplicates of a first portion of traffic information 201 from a production network 102. The hyper-scale monitoring fabric 502 may receive the one or more duplicates of the first portion of traffic information 201 from the production network 102 as N×first traffic information 201. The N×first traffic information 201 may each be associated with a monitoring mechanism (e.g., tap 116 or spanning port 114), an ingress interface 508, and a white box switch 506. That is, the same first traffic information 201 may be received as N×first traffic information 201. Recall that the first traffic information 201 may be received from the production network 102 as N×first traffic information 201 for the reason that the first traffic information 201 may be received by N×monitoring mechanisms, as it is communicated through the production network 102.

At operation 1114, the respective white box switch(es) 506 communicate the N×first traffic information 201 (e.g., duplicates of the first portion of traffic information 201) over the hyper-scale monitoring fabric 502 to a controller computer 512. The operation 1114 is described further in association with FIG. 11B.

At operation 1116, the controller computer 512 may store the N×first traffic information 201 in the database 515 as production network management information 900. The production network management information 900 further identifies the monitoring mechanism (e.g., tap 116 or spanning port 114), the ingress interface 508, and the white box switch 506 that were utilized to receive the first traffic information 201 into the hyper-scale monitoring fabric 502. For example, the production network management information 900 may include the N×first traffic information 201 that are respectively stored in association with a monitoring mechanism (e.g., tap 116 or spanning port 114) identifier, an ingress interface 508 identifier, and a white box switch 506 identifier that identify the components utilized to receive the first traffic information 201.

At operation 1118, the controller computer 512 may be utilized to configure a second plurality of white box switches to forward traffic information 201 in the hyper-scale monitoring fabric 502. According to various embodiments, the controller computer 512 may automatically configure the second plurality of white box switches 506 in response to an automatic analysis of the production network information 806 stored in the database 515. For example, the controller computer 512 may automatically configure multiple (e.g., a second plurality of) white box switches 506 in the hyper-scale monitoring fabric 502 to forward a second portion of the traffic information 201, through one or more white box switches 506 and over various links, as second traffic information 201, to the tool farm 504 in response to an automatic analysis of production network information 806. According to another embodiment, an administrator may manually configure one or more (e.g., a second plurality of) white box switches 506 in the hyper-scale monitoring fabric 502 to forward a second portion of the traffic information 201, as second traffic information 201, to the tool farm 504. For example, the administrator may identify a particular type of traffic (e.g., web traffic) as being of interest based on a forensic analysis of the production network information 806 that is stored in the database 515 and configure one or more white box switches 506 to forward the identified traffic over the hyper-scale monitoring fabric 502 for further analysis by a tool 106 in the tool farm 504. To this end, the administrator may configure multiple white box switches 506 to receive a duplicate of a second portion of the traffic information 201 from the production network 102 at a first ingress interface 508 and forward the second portion of the traffic information 201 over a second plurality of white box switches 506 to exit the hyper-scale monitoring fabric 502 at an egress interface 510 that is connected to an egress link 511 that, in turn, is connected to a tool 106 in a tool farm 504. The operation 1118 is described further in association with FIG. 11C.

At operation 1120, an ingress interface 508, at a white box switch 506, in the hyper-scale monitoring fabric 502, may receive a duplicate of a second portion of the traffic information 201 from the production network 102 as second traffic information 201. For example, a monitoring mechanism (e.g., tap 116 or spanning port 114) may receive the duplicate of the second portion of traffic information 201 that is being communicated from North to South or South to North in the production network 102 and communicate the duplicate of the second portion of traffic information 201 over an ingress link 507 to the ingress interface 508, at a white box switch 506, where it is received as second traffic information 201.

At operation 1122, the white box switch 506 that received the second traffic information 201 forwards the second traffic information 201 over a particular fabric link 514 to a white box switch 506 that, in turn, forwards the second traffic information 201 over a particular fabric link 514, and so on until the second traffic information 201 exits the hyper-scale monitoring fabric 502 through an egress interface 510 that, in turn, is connected to an egress link 511 that is connected to a tool farm 504. In one embodiment, the hyper-scale monitoring fabric 502 may be configured to forward the second traffic information 201 out multiple egress interfaces 510 to different tools 106 in the tool farm 504. The operation 1122 is described further in association with FIG. 11D.

Figure 11B:
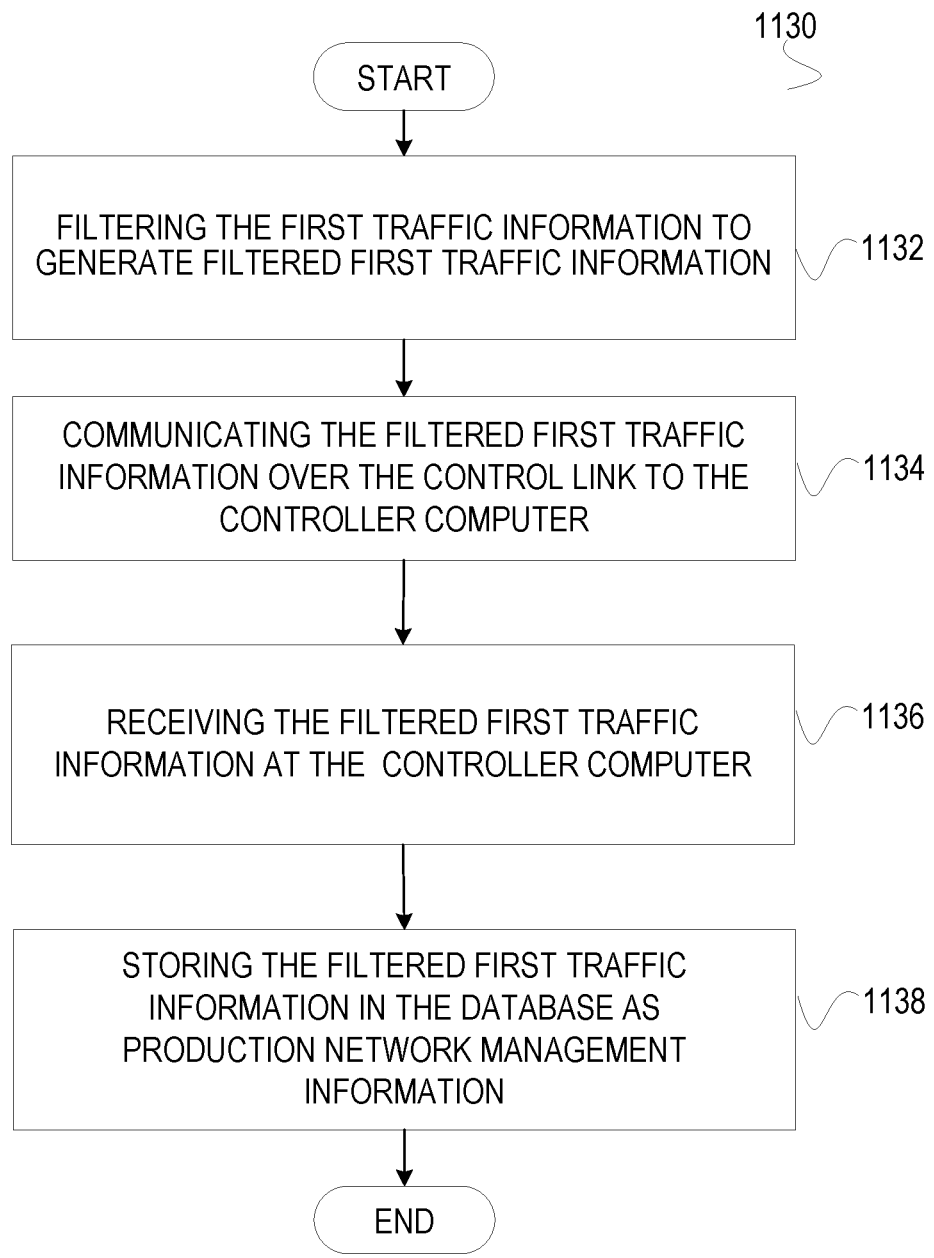
FIG. 11B is a flowchart illustrating a method, according to an example embodiment, to filter first traffic information.

FIG. 11B is a block diagram illustrating a method 1130, according to an example embodiment, to filter first traffic information 201. The method 1130 provides a further description of operation 1114 in FIG. 11A. At operation 1132, a receiving module 702, at a white box switch 506, may filter the first traffic information 201 to generate filtered first traffic information 201. Merely for example, the white box switch 506 may filter the first traffic information 201 to generate filtered first traffic information 201 such as "web traffic." Further, according to various embodiments, N×white box switches 506 may filter the same first traffic information 201.

At operation 1134, the processing module(s) 704, at the white box switch(es) 506, communicates the filtered first traffic information 201 over the control link 516 to the controller computer 512.

At operation 1136, the communication module 800, at the controller computer 512, receives the filtered first traffic information 201, and at operation 1138, the process module 802 stores the filtered first traffic information 201 in the database 515 as production network management information 900.

Figure 11C:
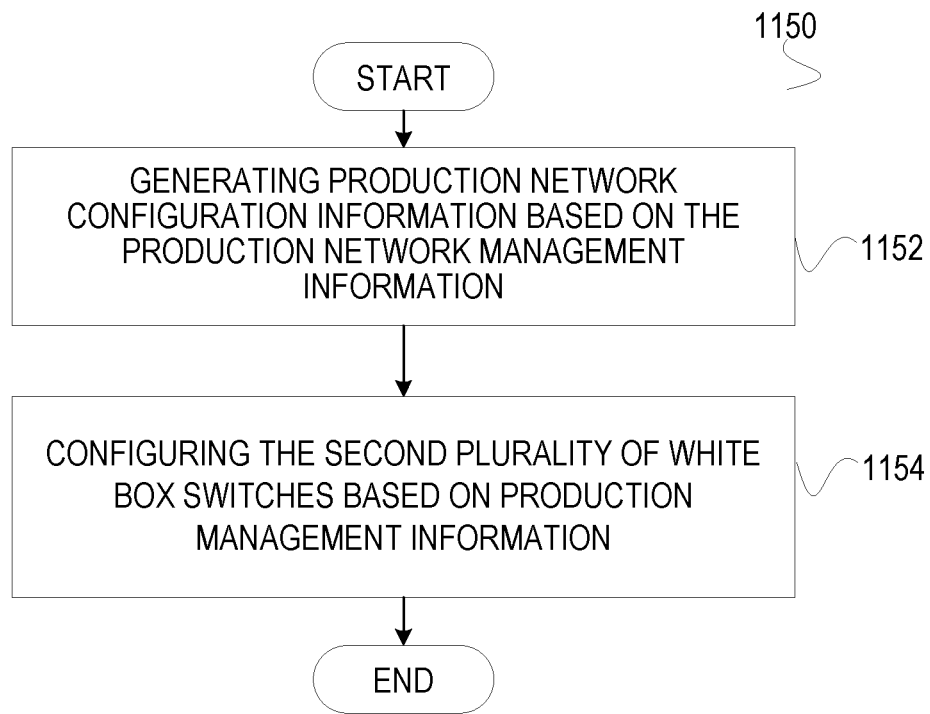
FIG. 11C is a flowchart illustrating a method, according to an example embodiment, to configure white box switches.

FIG. 11C is a block diagram illustrating a method 1150, according to an example embodiment, to configure white box switches 506. The method 1150 provides a further description of operation 1118 in FIG. 11A. At operation 1152, at the controller computer 512, the process module 802 generates production network configuration information 902 based on the production network management information 900. Recall that the production network configuration information 902 describes network elements in the production network 102.

At operation 1154, the process module 802 automatically configures the second plurality of white box switches 506 in the hyper-scale monitoring fabric 502 based on production network information 806 to forward the second traffic information 201. Merely for example, the process module 802 may select 1) a particular monitoring mechanism (e.g., tap 116 or spanning port 114), 2) an ingress interface 508, 3) one or more white box switches 506, 4) one or more fabric links 514, and 5) an egress interface 510 to forward the second traffic information 201 from the production network 102 to the tool farm 504. Recall that the production network information 806 includes production network management information 900 and production network configuration information 902. For example, the process module 802, at the controller computer 512, may configure the second plurality of white box switches 506 for receiving a duplicate of a second portion of the traffic information 201 at a particular ingress interface 508, as second traffic information 201, and forwarding the second portion of the traffic information 201 over the hyper-scale monitoring fabric 502 to exit the hyper-scale monitoring fabric 502 from a particular egress interface 510 that is connected to a tool farm 504, as is described further in association with FIG. 6.

Figure 11D:
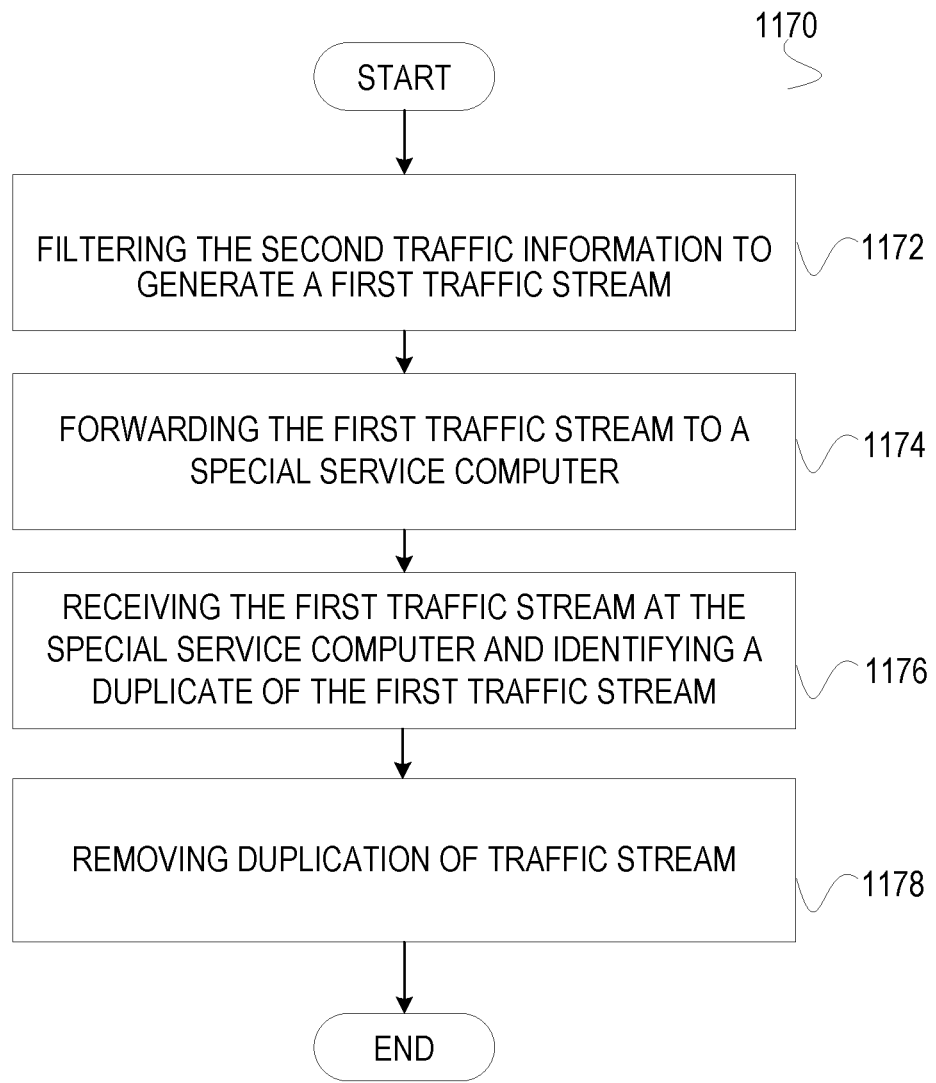
FIG. 11D is a flowchart illustrating a method, according to some example embodiments, to forward traffic information.

FIG. 11D is a block diagram illustrating a method 1170, according to some example embodiments, to forward traffic information 201. The method 1170 provides a further description of operation 1122 in FIG. 11A. At operation 1172, a white box switch 506 may receive traffic information 201 from the production network 102 as a first traffic stream. In some embodiments, the white box switch 506 may further filter the traffic information 201 to generate the first traffic stream. For example, the white box switch 506 may receive traffic information 201 from the production network 102 in the form of second traffic information 201 and filter the second traffic information 201 to generate a first traffic stream.

At operation 1174, the white box switch 506 may forward the first traffic stream to the special service computer 518. For example, the white box switch 506 may forward the first traffic stream over the hyper-scale monitoring fabric 502 via other white box switches 506 and fabric links 514 to the special service computer 518. Other embodiments may utilize the white box switch 506 to communicate the first traffic stream to the special service computer 518. For example, the white box switch 506 that is associated with the ingress interface 508 that receives the second traffic information 201 may communicate the first traffic stream over the control link 516 to the special service computer 518.

At operation 1176, the special service computer 518 receives the first traffic stream and compares the first traffic stream with other traffic streams to identify a duplicate of the first traffic stream. For example, the other traffic streams may include one or more traffic streams from the production network 102 that are presently being forwarded over the hyper-scale monitoring fabric 502 to the tool farm 504, one or more traffic streams from the production network 102 that are candidates for forwarding over the hyper-scale monitoring fabric 502 to the tool farm 504, one or more traffic streams that are being received from the production network 102, and one or more traffic streams that were previously received from the production network 102 and are presently stored in the database 515.

At operation 1178, the special service computer 518 may remove the identified duplication of the first traffic stream. For example, the special service computer 518 may remove duplication of the first traffic stream by causing the first traffic stream to not be forwarded over the hyper-scale monitoring fabric 502. Further, for example, the special service computer 518 may remove duplication of the first traffic stream by causing the other traffic stream to not be forwarded over the hyper-scale monitoring fabric 502.

FIG. 12 is a schematic diagram illustrating a user interface 1200, according to an example embodiment. The user interface 1200 may be generated and communicated to the monitor that is communicatively coupled to the controller computer 512. The user interface 1200 may be generated and communicated by the forensic module 804 in response to the forensic module 804 receiving a command. For example, a network administrator may communicate an "OBSERVED IP command" via the monitor to the controller computer 512 for processing by the forensic module 804. In response to receiving the command, the forensic module 804 may generate the user interface 1200 and communicate the user interface 1200 to the monitor. The user interface 1200 may be generated by the forensic module 804 based on the production network information 806 and the hyper-scale monitoring fabric information 808. For example, the user interface 1200 may include user interface elements including a switch name (e.g., column marked "Switch Alias") that names a white box switch 506, a switch path identifier (e.g., column marked "Switch") that identifies a path to the white box switch 506, an ingress interface name (e.g., column marked "Interface") that identifies the name of an ingress interface 508, a monitoring mechanism identifier (e.g., column marked "Tap Interface") that identifies a monitoring mechanism including a tap 116 or a spanning port 114, and a VLAN identifier (e.g., column marked "Observed IPs") that identifies a VLAN in association with IP addresses for devices (e.g., devices 112) on the associated VLAN.

FIG. 13 is a schematic diagram illustrating a user interface 1300, according to an example embodiment. The user interface 1300 may be generated and communicated to the monitor that is communicatively coupled to the controller computer 512. The user interface 1300 may be generated and communicated by the forensic module 804 in response to the forensic module 804 receiving a command. For example, a network administrator may communicate a "DHCP TRACKER command" via the monitor to the controller computer 512 for processing by the forensic module 804. In response to receiving the command, the forensic module 804 may generate the user interface 1300 and communicate the user interface 1300 to the monitor. The user interface 1300 may be generated by the forensic module 804 based on the production network information 806 and the hyper-scale monitoring fabric information 808. For example, the user interface 1300 may include user interface elements including a server address identifier (e.g., column marked "Server Address") that identifies an address of a DHCP server on the production network 102, a client count (e.g., column marked "Client Count") that counts the number of hosts with an address lease from the DHCP server on the production network 102, a lease time quantity (e.g., column marked "Lease Time") indicating how long the address lease is valid for, a relay flag (e.g., column marked "Relay") indicating that the DHCP server machine acts as a forwarder of DHCP requests and responses, and subnet identifiers (e.g., column marked "Subnets") that identify subnets on the production network 102 in association with the previously mentioned fields.

FIG. 14 is a schematic diagram illustrating a user interface 1400, according to an example embodiment. The user interface 1400 may be generated and communicated to the monitor that is communicatively coupled to the controller computer 512. The user interface 1400 may be generated and communicated by the forensic module 804 in response to the forensic module 804 receiving a command. For example, a network administrator may communicate a "TOPOLOGY command" via the monitor to the controller computer 512 for processing by the forensic module 804. In response to receiving the command, the forensic module 804 may generate the user interface 1400 and communicate the user interface 1400 to the monitor. The user interface 1400 may be generated by the forensic module 804 based on the production network information 806 and the hyper-scale monitoring fabric information 808. For example, the user interface 1400 may include a switch section (e.g., marked "Switch") that includes user interface elements describing a white box switch 506, an interface section (e.g., marked "Interface") that includes user interface elements describing an ingress interface 508 that is connected to the white box switch 506, a tap configuration section (e.g., marked "Tap Configuration") that includes user interface elements describing a tap 116 that is connected to the ingress interface 508, and a connected device section (e.g., marked "Connected Device") that includes user interface elements describing the port on the production network 102 that is connected to the tap 116.

FIG. 15 is a schematic diagram illustrating a user interface 1500, according to an example embodiment. The user interface 1500 may be generated and communicated to the monitor that is communicatively coupled to the controller computer 512. The user interface 1500 may be generated and communicated by the forensic module 804 in response to the forensic module 804 receiving a command. For example, a network administrator may communicate a "TCP CONNECTIONS command" via the monitor to the controller computer 512 for processing by the forensic module 804. In response to receiving the command, the forensic module 804 may generate the user interface 1500 and communicate the user interface 1500 to the monitor. The user interface 1500 may be generated by the forensic module 804 based on the production network information 806 and the hyper-scale monitoring fabric information 808. For example, the user interface 1500 may include user interface elements including a TCP client address (e.g., column marked "TCP Client") that includes an address of a TCP client on the production network 102, a Client Name (e.g., column marked "Client Host") that includes a name of a TCP client on the production network 102, a TCP server address (e.g., column marked "TCP Server") that includes an address of a TCP server on the production network 102, a host name (e.g., column marked "Server Host") that includes an address of a host on the production network 102, an application (e.g., column marked "Application") that identifies an application service that the host is accessing, and a connection start (e.g., column marked "Connection Start") that shows when the host started to access the application service.

FIG. 16 is a schematic diagram illustrating a user interface 1600, according to an example embodiment. The user interface 1600 may be generated and communicated to the monitor that is communicatively coupled to the controller computer 512. The user interface 1600 may be generated and communicated by the forensic module 804 in response to the forensic module 804 receiving a command. For example, a network administrator may communicate a "HOSTS TRACKER command" via the monitor to the controller computer 512 for processing by the forensic module 804. In response to receiving the command, the forensic module 804 may generate the user interface 1600 and communicate the user interface 1600 to the monitor. The user interface 1600 may be generated by the forensic module 804 based on the production network information 806 and the hyper-scale monitoring fabric information 808. For example, the user interface 1600 may include user interface elements including a host name (e.g., column marked "Host Name") that includes the name of a host on the production network 102, an ingress name (e.g., column marked "Filter Interfaces") that includes the name of an ingress interface 508 on the hyper-scale monitoring fabric 502, an ingress interface count (e.g., column marked "Filter Interface Count") that counts the number of ingress interfaces 508 on the hyper-scale monitoring fabric 502 in association with the host name, an IP address (e.g., column marked "IP Address") associated with the host, a MAC address (e.g., column marked "MAC Address") associated with the host, a vendor name (e.g., column marked "Vendor") indicating the vendor that manufactured the hardware device, a VLAN identifier (e.g., column marked "VLAN IDs") indicating the subnet the host resides in, extra information (e.g., column marked "Extra Info") for additional information discovered about the host, a first seen (e.g., column marked "First Seen") indicating when the host first appeared in the production network 102, and a last seen (e.g., column marked "Last Seen") indicating when the host was last seen in the production network 102.

FIG. 17 is a schematic diagram illustrating a user interface 1700, according to an example embodiment. The user interface 1700 may be generated and communicated to the monitor that is communicatively coupled to the controller computer 512. The user interface 1700 may be generated and communicated by the forensic module 804 in response to the forensic module 804 receiving a command. For example, a network administrator may communicate a "DNS QUERIES command" via the monitor to the controller computer 512 for processing by the forensic module 804. In response to receiving the command, the forensic module 804 may generate the user interface 1700 and communicate the user interface 1700 to the monitor. The user interface 1700 may be generated by the forensic module 804 based on the production network information 806 and the hyper-scale monitoring fabric information 808. For example, the user interface 1700 may include user interface elements including a client IP address (e.g., column marked "Client IP") that is an IP address of a host on the production network 102 making a DNS request to get an IP address of the target host name, client name (e.g., column marked "Client Name") that is the name of the client host (if known) on the production network 102, a target IP address (e.g., column marked "Target IP") that includes the name of the client host on the production network 102 or on any network connected to the production network 102, and a target name (e.g., column marked "Target Name") that includes the URL of the target on the production network 102.

FIG. 18 is a schematic diagram illustrating a user interface 1800, according to an example embodiment. The user interface 1800 may be generated and communicated to the monitor that is communicatively coupled to the controller computer 512. The user interface 1800 may be generated and communicated by the forensic module 804 in response to the forensic module 804 receiving a command. For example, a network administrator may communicate a "DNS TRACKER command" via the monitor to the controller computer 512 for processing by the forensic module 804. In response to receiving the command, the forensic module 804 may generate the user interface 1800 and communicate the user interface 1800 to the monitor. The user interface 1800 may be generated by the forensic module 804 based on the production network information 806 and the hyper-scale monitoring fabric information 808. For example, the user interface 1800 may include user interface elements including a server address (e.g., column marked "Server Address") that includes the IP address of a server on the production network 102, a server name (e.g., column marked "Server Name") that includes the name of the server, and subnet identifiers (e.g., column marked "Subnets") that include identifiers for subnets on the production network 102.

Machine and Software Architecture

The modules, methods, engines, applications, and so forth described in conjunction with FIGS. 1-18 are implemented in some embodiments in the context of multiple machines and associated software architectures. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosure in different contexts from the disclosure contained herein.

Software Architecture

Figure 19:
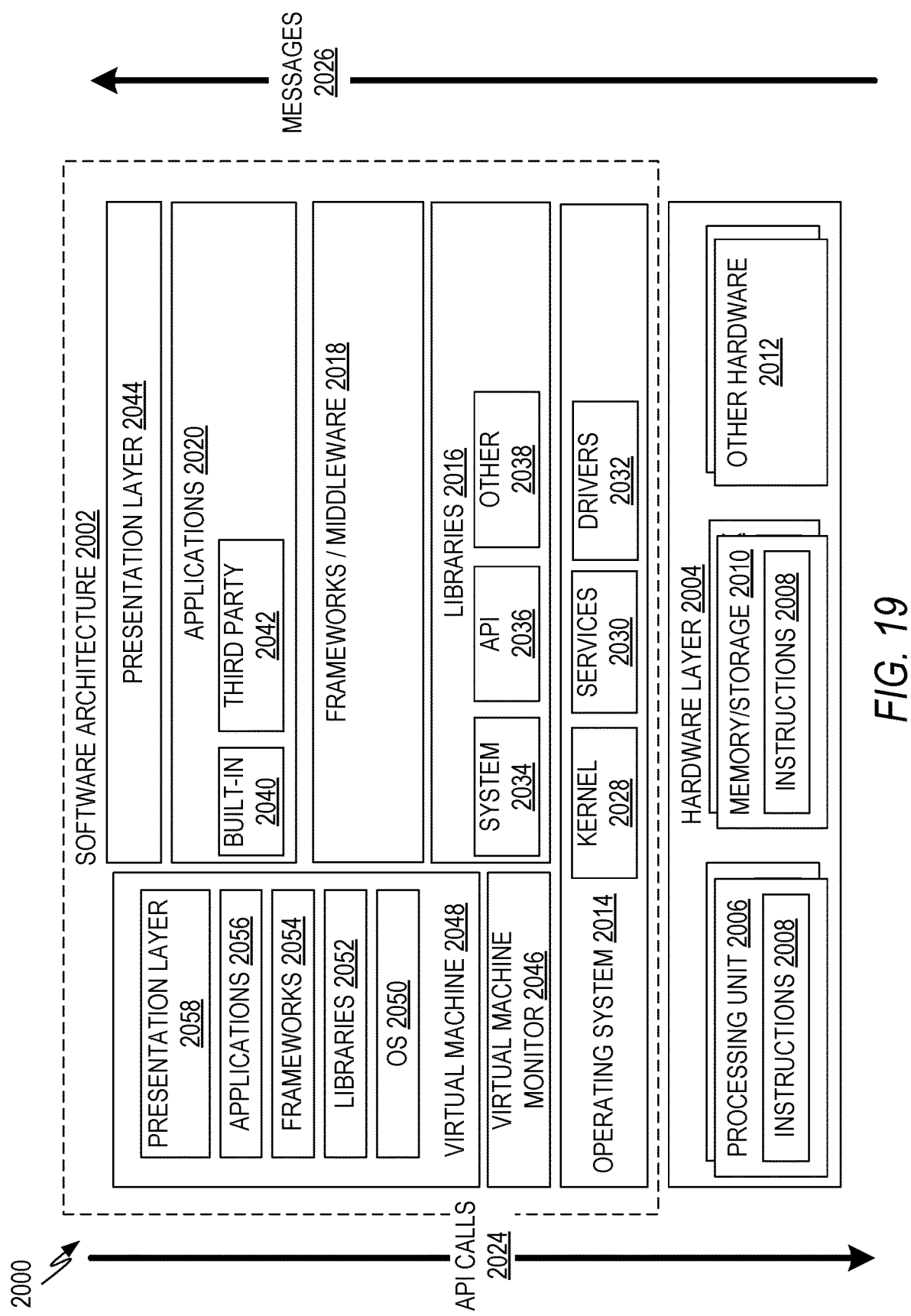
FIG. 19 is a block diagram illustrating a representative software architecture.

FIG. 19 is a block diagram 2000 illustrating a representative software architecture 2002, which may be used in conjunction with various hardware architectures herein described. FIG. 19 is merely a non-limiting example of a software architecture 2002, and it will be appreciated that many other architectures may be implemented to facilitate the functionality described herein. The software architecture 2002 may be executing on hardware such as a machine 2100 of FIG. 20 that includes, among other things, processors 2110, memory/storage 2130, and I/O components 2150. Returning to FIG. 19, a representative hardware layer 2004 is illustrated and can represent, for example, the machine 2100 of FIG. 20. The representative hardware layer 2004 comprises one or more processing units 2006 having associated executable instructions 2008. The executable instructions 2008 represent the executable instructions of the software architecture 2002, including implementation of the methods, engines, modules, and so forth of FIGS. 1-18. The hardware layer 2004 also includes memory and/or storage modules 2010, which also have the executable instructions 2008. The hardware layer 2004 may also comprise other hardware 2012, which represents any other hardware of the hardware layer 2004, such as the other hardware 2012 illustrated as part of the machine 2100.

In the example architecture of FIG. 19, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke application programming interface (API) calls 2024 through the software stack and receive a response, returned values, and so forth, illustrated as messages 2026, in response to the API calls 2024. The layers illustrated are representative in nature, and not all software architectures have all layers. For example, some mobile or special purpose operating systems 2014 may not provide a frameworks/middleware 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), AAC, AMR, joint photography experts group (JPG), or portable network graphics (PNG)), graphics libraries (e.g., an Open Graphics Library (OpenGL) framework that may be used to render 2D and 3D graphic content on a display), database libraries (e.g., Structured Query Language (SQL), SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be utilized by the applications 2020 and/or other software components/modules, some of which may be specific to a particular operating system 2014 or platform.

The applications 2020 include built-in applications 2040 and/or third party applications 2042. Examples of representative built-in applications 2040 may include, but are not limited to, a contacts application, a browser application, a book reader application, a location application, a media application, a messaging application, and/or a game application. Third party applications 2042 may include any of the built-in applications as well as a broad assortment of other applications 2020. In a specific example, the third party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third party application 2042 may invoke the API calls 2024 provided by the mobile operating system such as the operating system 2014 to facilitate functionality described herein.

The applications 2020 may utilize built-in operating system functions (e.g., kernel 2028, services 2030, and/or drivers 2032), libraries (e.g., system libraries 2034, API libraries 2036, and other libraries 2038), and frameworks/middleware 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures 2002 utilize virtual machines. In the example of FIG. 19, this is illustrated by a virtual machine 2048. The virtual machine 2048 creates a software environment where applications/modules can execute as if they were executing on a hardware machine (such as the machine 2100 of FIG. 20, for example). The virtual machine 2048 is hosted by a host operating system (e.g., operating system 2014 in FIG. 21) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Example Machine Architecture and Machine-Readable Medium

Figure 20:
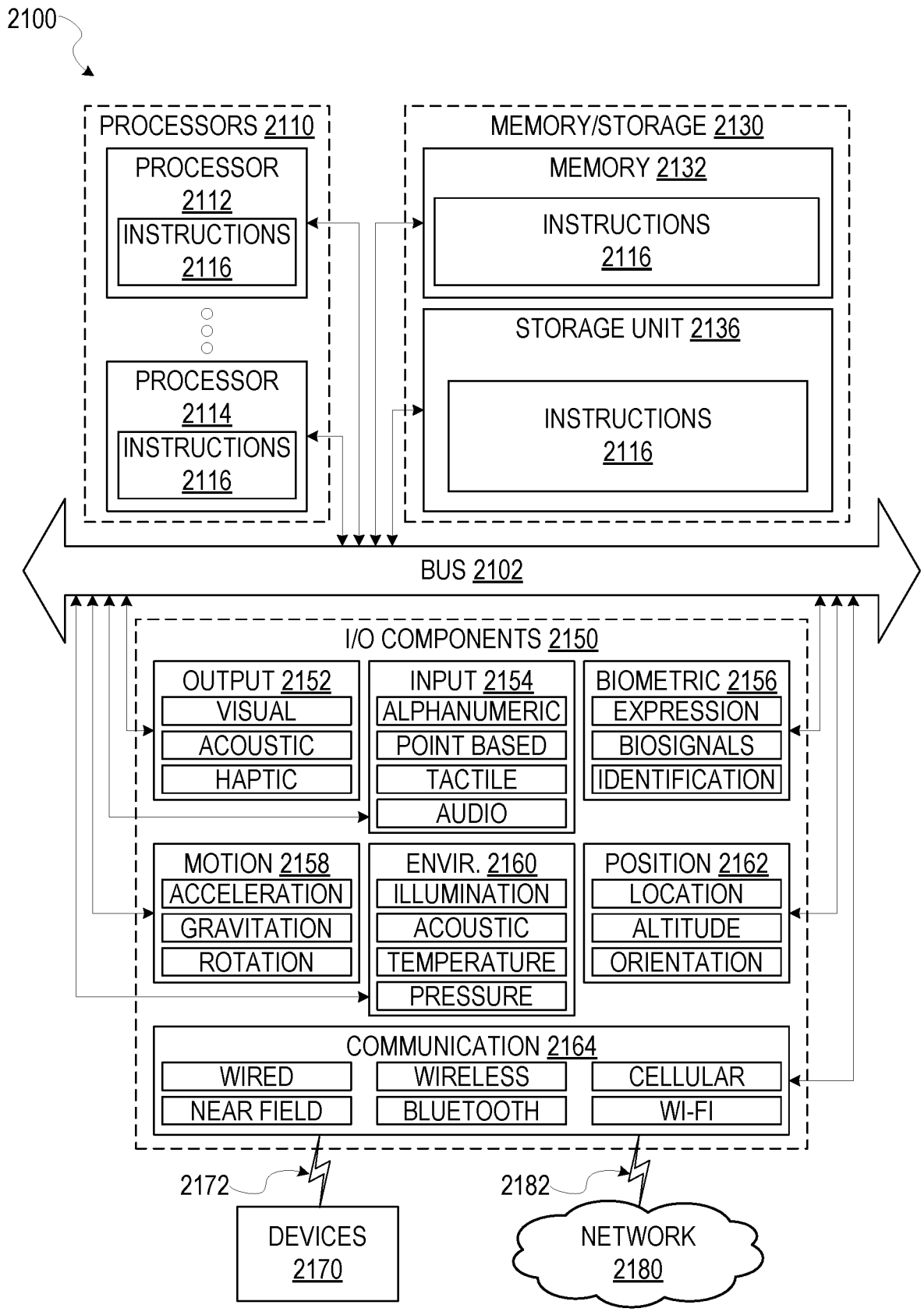
FIG. 20 is a block diagram illustrating components of a machine, according to some example embodiments.

FIG. 20 is a block diagram illustrating components of a machine 2100, according to some example embodiments, able to read instructions from a machine-readable medium (e.g., a machine-readable storage medium) and perform any one or more of the methodologies discussed herein. Specifically, FIG. 20 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, the instructions 2116 may cause the machine 2100 to execute the flow diagrams of FIGS. 11A-11D. Additionally, or alternatively, the instructions 2116 may implement the tool 106 of FIG. 5; the receiving module 702, the processing module 704, and the switching mesh 708 of FIG. 7; the communication module 800, the process module 802, and the forensic module 804 of FIG. 8; and so forth, including the modules, engines, and applications in FIG. 5. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 2112 and a processor 2114 that may execute the instructions 2116. The term "processor" is intended to include multi-core processors 2110 that may comprise two or more independent processors 2110 (sometimes referred to as "cores") that may execute the instructions 2116 contemporaneously. Although FIG. 20 shows multiple processors 2110, the machine 2100 may include a single processor 2110 with a single core, a single processor 2110 with multiple cores (e.g., a multi-core processor), multiple processors 2110 with a single core, multiple processors 2110 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-readable media.

As used herein, "machine-readable medium" means a device able to store the instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine (e.g., processors 2110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 20. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172 respectively. For example, the communication components 2164 may include a network interface component or other suitable device to interface with the network 2180. In further examples, the communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor and memory having instructions that, when executed, cause the at least one processor to perform operations comprising:
   receiving a duplicate of a first portion of traffic information from a first network as first traffic information, the first traffic information being received at a plurality of ingress interfaces providing access to a monitoring fabric;
   receiving the first traffic information, in the monitoring fabric with a first plurality of switches that are controlled by a controller, at the controller;
   storing the first traffic information in a storage system;
   configuring a second plurality of switches in the monitoring fabric based on the first traffic information;
   receiving a duplicate of a second portion of the traffic information from the first network as second traffic information, the second traffic information being received at a first ingress interface included in the plurality of ingress interfaces providing access to the monitoring fabric; and
   forwarding the second traffic information in the monitoring fabric with the second plurality of switches, the forwarding including forwarding the second traffic information over at least one egress interface to at least one tool that is utilized to monitor the traffic information in the first network.

2. The system of claim 1, wherein the monitoring fabric includes a virtual monitoring fabric.

3. The system of claim 2, wherein the first plurality of switches includes a first plurality of virtual switches and wherein the second plurality of switches includes a second plurality, of virtual switches.

4. The system of claim 3, wherein the controller includes a virtual controller and wherein the storage system includes a cloud-based storage system and wherein the at least one tool includes a virtual tool farm.

5. The system of claim 4, wherein the virtual monitoring fabric includes the first plurality of virtual switches, the second plurality of virtual switches, the virtual controller, and the cloud-based storage system.

6. The system of claim 1, wherein the monitoring fabric includes a hyper-scale monitoring fabric.

7. The system of claim 1, wherein the first plurality of switches includes a first plurality of switching machines and wherein the second plurality of switches includes a second plurality of switching machines.

8. The system of claim 7, wherein the first plurality of switching machines includes a first plurality of white box switches and wherein the second plurality of switching machines includes a second plurality of white box switches.

9. The system of claim 1, wherein the controller includes a controller computer and wherein the storage system includes a database and wherein and wherein the at least one tool includes a physical tool farm.

10. A method comprising:
receiving a duplicate of a first portion of traffic information from a first network as first traffic information, the first traffic information being received at a plurality of ingress interfaces providing access to a monitoring fabric;
receiving the first traffic information, in the monitoring fabric with a first plurality of switches that are controlled by a controller, at the controller;
storing the first traffic information in a storage system;
configuring a second plurality of switches in the monitoring fabric based on the first traffic information;
receiving a duplicate of a second portion of the traffic information from the first network as second traffic information, the second traffic information being received at a first ingress interface included in the plurality of ingress interfaces providing access to the monitoring fabric; and
forwarding the second traffic information in the monitoring fabric with the second plurality of switches, the forwarding including forwarding the second traffic information over at least one egress interface to at least one tool that is utilized to monitor the traffic information in the first network.

11. The method of claim 10, wherein the monitoring fabric includes a virtual monitoring fabric.

12. The method of claim 11, wherein the first plurality of switches includes a first plurality of virtual switches and wherein the second plurality of switches includes a second plurality of virtual switches.

13. The method of claim 12, wherein the controller includes a virtual controller and wherein the storage system includes a cloud-based storage system and wherein the at least one tool includes a virtual tool farm.

14. The method of claim 13, wherein the virtual monitoring fabric includes the first plurality of virtual switches and the second plurality of virtual switches.

15. The method of claim 13, wherein the first network includes a production network.

16. The method of claim 10, wherein the monitoring fabric includes a hyper-scale monitoring fabric.

17. The method of claim 10, wherein the first plurality of switches includes a first plurality of switching machines and wherein the second plurality of switches includes a second plurality of switching machines.

18. The method of claim 17, wherein the first plurality of switching machines includes a first plurality of white box switches and wherein the second plurality of switching machines includes a second plurality of white box switches.

19. The method of claim 10, wherein the controller includes a controller computer and wherein the storage system includes a database and wherein and wherein the at least one tool includes a physical tool farm.

20. A non-transitory machine-readable medium and storing a set of instructions that, when executed by a processor; causes a machine to perform operations comprising:
receiving a duplicate of a first portion of traffic information from a first network as first traffic information, the first traffic information being received at a plurality of ingress interfaces providing access to a monitoring fabric;
receiving the first traffic information, in the monitoring fabric with a first plurality of switches that are controlled by a controller, at the controller;
storing the first traffic information in a storage system;
configuring a second plurality of switches in the monitoring fabric based on the first traffic information;
receiving a duplicate of a second portion of the traffic information from the first network as second traffic information, the second traffic information being received at a first ingress interface included in the plurality of ingress interfaces providing access to the monitoring fabric; and
forwarding the second traffic information in the monitoring fabric with the second plurality of switches, the forwarding including forwarding the second traffic information over at least one egress interface to at least one tool that is utilized to monitor the traffic information in the first network.

* * * * *

UNITED STATES PATENT AND TRADEMARK OFFICE
CERTIFICATE OF CORRECTION

PATENT NO. : 10,979,291 B2
APPLICATION NO. : 16/121247
DATED : April 13, 2021
INVENTOR(S) : Izard et al.

Page 1 of 1

It is certified that error appears in the above-identified patent and that said Letters Patent is hereby corrected as shown below:

In the Claims

In Column 27, Line 6, in Claim 3, delete "plurality," and insert --plurality-- therefor In Column 27, Line 27, in Claim 9, delete "and wherein and wherein" and insert --and wherein-- therefor In Column 28, Line 26, in Claim 19, delete "and wherein and wherein" and insert --and wherein-- therefor In Column 28, Line 29, in Claim 20, delete "processor;" and insert --processor,-- therefor Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*